United States Patent
Takeyama

(10) Patent No.: US 6,522,473 B2
(45) Date of Patent: Feb. 18, 2003

(54) OBSERVING OPTICAL SYSTEM AND IMAGING OPTICAL SYSTEM

(75) Inventor: Tetsuhide Takeyama, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 246 days.

(21) Appl. No.: 09/725,014

(22) Filed: Nov. 29, 2000

(65) Prior Publication Data

US 2002/0060850 A1 May 23, 2002

(30) Foreign Application Priority Data

Sep. 22, 2000 (JP) ........................... 2000-293999

(51) Int. Cl.$^7$ .................... G02B 27/10; G02B 17/08; G03H 1/00
(52) U.S. Cl. .................... 359/631; 359/14; 359/633; 359/727; 359/732
(58) Field of Search ............... 359/13, 14, 15, 359/727, 732, 631, 633

(56) References Cited

U.S. PATENT DOCUMENTS 4,763,990 A * 8/1988 Wood ........................ 359/15
4,874,214 A * 10/1989 Cheysson et al. ........... 359/15
5,737,124 A * 4/1998 Sarayeddine ............... 359/629

* cited by examiner

*Primary Examiner*—Scott J. Sugarman
(74) *Attorney, Agent, or Firm*—Pillsbury Winthrop LLP

(57) ABSTRACT

An optical system invention is interposed between a pupil plane and an image plane, and includes a first prism, a second prism, and a holographic element which is sandwiched between the first prism and the second prism and is cemented to these prisms. When a light beam traveling along the optical path connecting the pupil plane and the image plane through the optical system is called a first beam, the first prism has a 1-1 surface placed on the pupil side, combining the function of transmission with the function of reflection of the first beam; a 1-2 surface placed on the opposite side of the pupil with respect to the 1-1 surface; and a 1-3 surface placed on the image side, transmitting the first beam. The second prism includes a 2-1 surface having the same shape as the 1-2 surface and placed opposite thereto, transmitting the first beam at least twice, and a 2-2 surface placed on the opposite side of the pupil with respect to the 2-1 surface of the second prism, reflecting the first beam. The holographic element is designed so that the first beam, when entering the holographic element at a first incident angle, is diffracted and reflected and when entering the holographic element at a second or third incident angle, is transmitted.

33 Claims, 19 Drawing Sheets

WHEN MEDIUM IS AIR AND n=1,
$$\Phi_0^{2P} = -r_2 - r_1 < 0$$

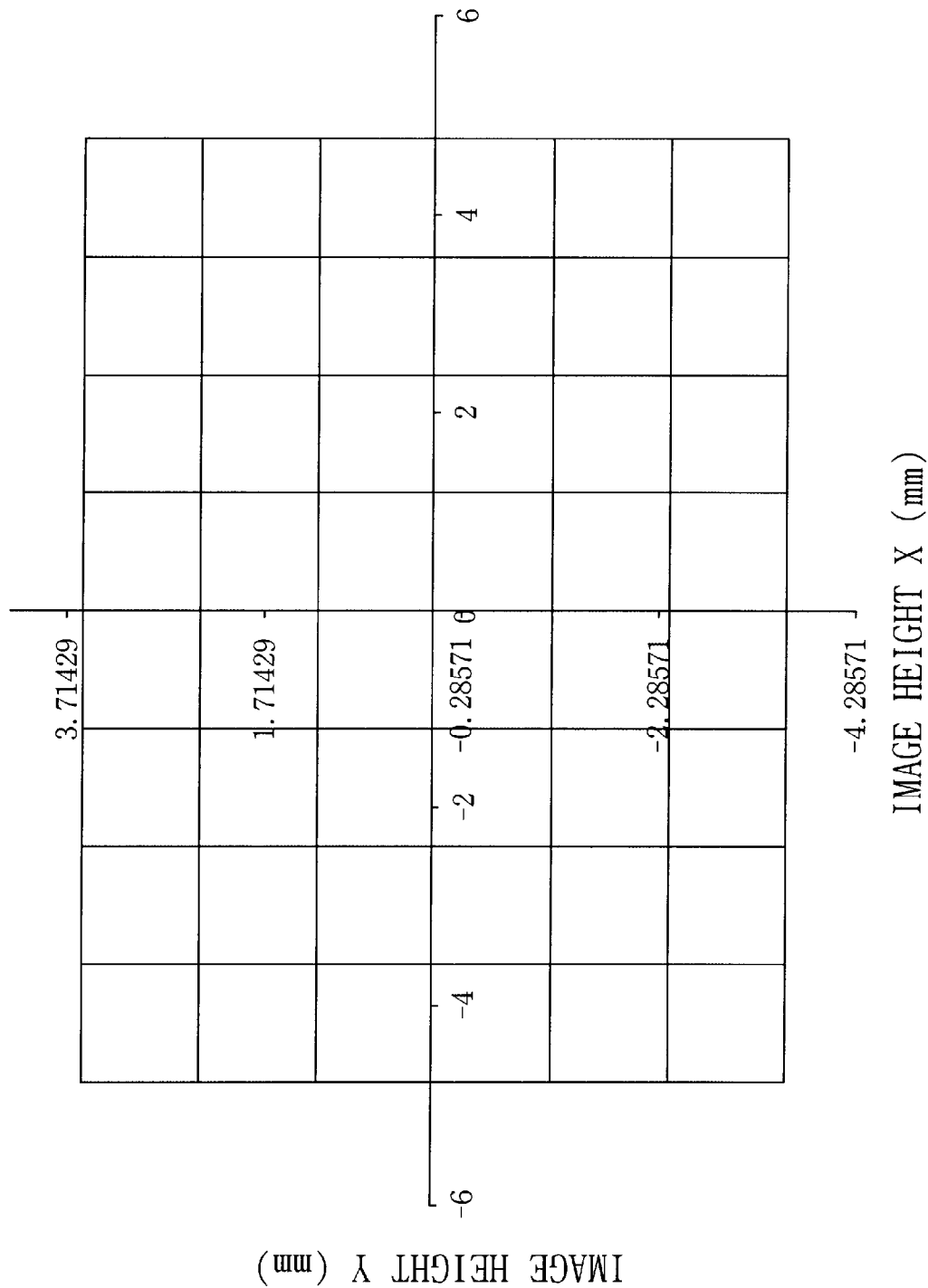

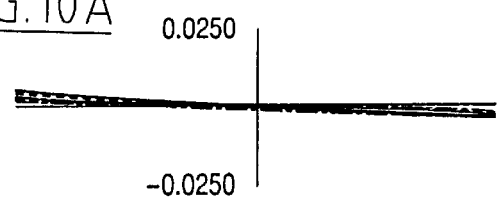
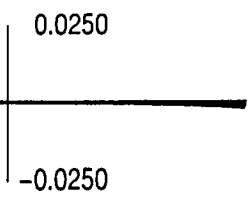
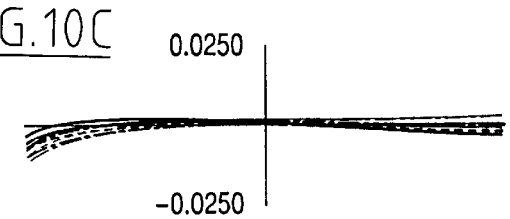
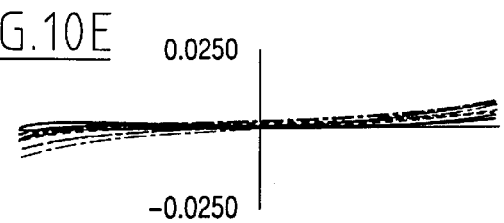
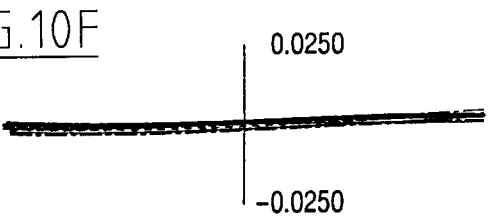
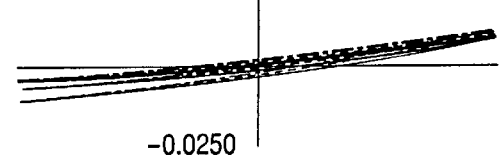
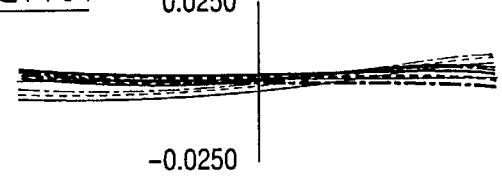
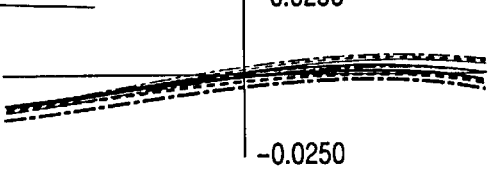
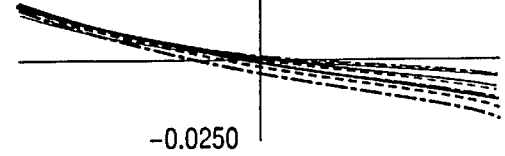
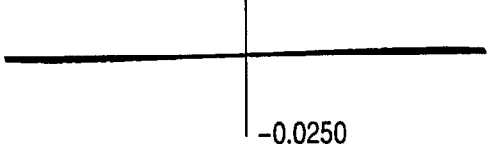
FIG.10A, FIG.10B, FIG.10C, FIG.10D, FIG.10E, FIG.10F, FIG.10G, FIG.10H, FIG.10I, FIG.10J, FIG.10K, FIG.10L
——— 650.0 NM   ——— 540.0 NM   ——— 490.0 NM
------ 630.0 NM   ------ 520.0 NM   ------ 470.0 NM
—·— 610.0 NM   —·— 500.0 NM   —·— 450.0 NM

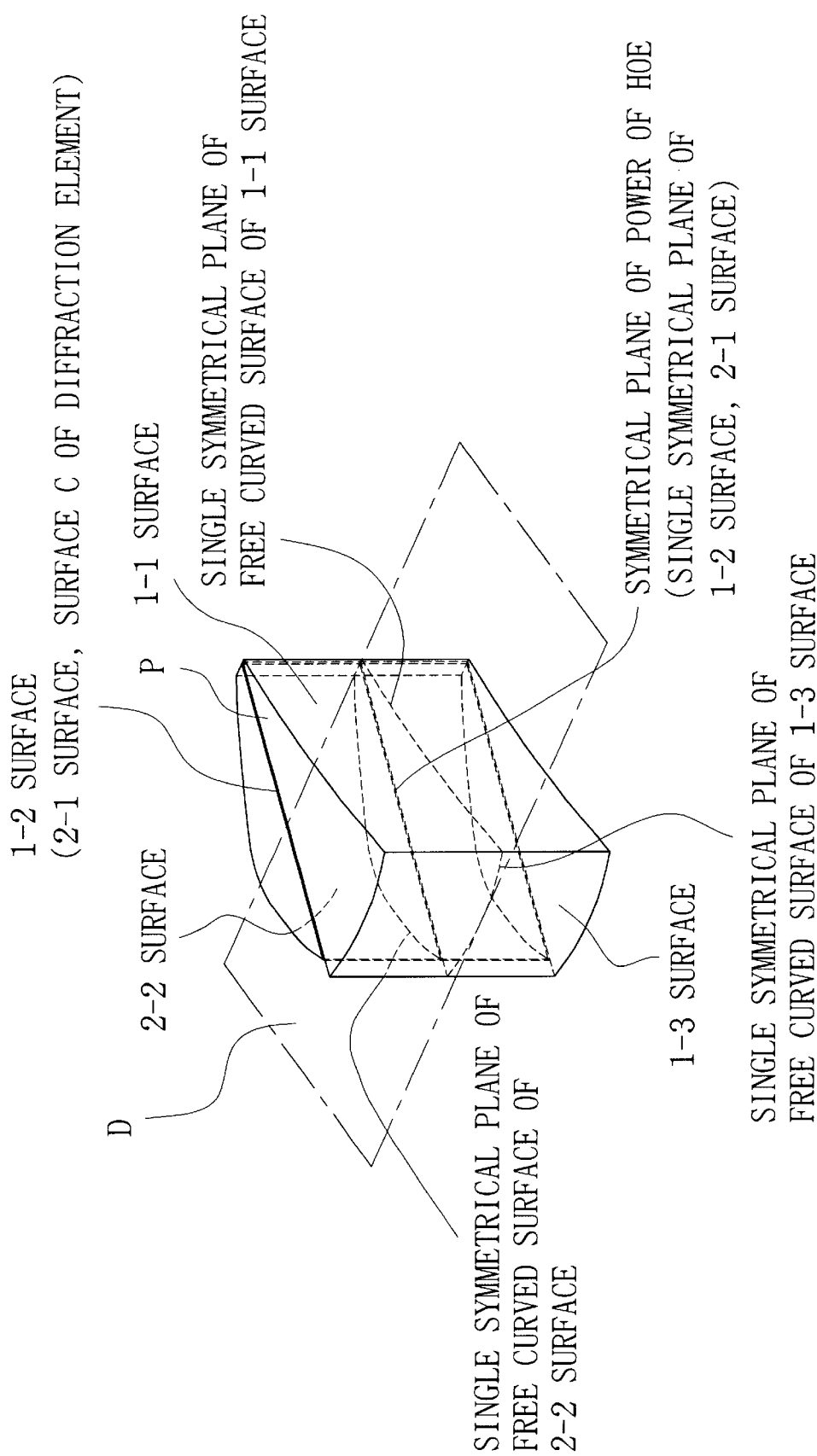

OBSERVING OPTICAL SYSTEM AND IMAGING OPTICAL SYSTEM

BACKGROUND OF THE INVENTION

1. Field of the Invention

This invention relates to an observing optical system and an imaging optical system and, in particular, to an optical system used in an image display which can be held to an observer's head or face or added to a cellular phone or a personal digital assistant or in an imaging apparatus such as a camera.

2. Description of Related Art

In recent years, the development of image displays, notably head- or face-mounted image displays which are intended to enjoy a large-sized picture by oneself has been promoted. Moreover, in keeping with the popularization of cellular phones and personal digital assistants, there is a heavy demand from observers who wish to view the images and data of the cellular phones and personal digital assistants through large-sized pictures.

Techniques that an observer is capable of viewing an image on the display surface of an image display means by using an optical system constructed with three surfaces including rotational asymmetrical transmitting and reflecting surfaces to display a virtual image are disclosed in Japanese Patent Preliminary Publication Nos. Hei 8-234137, Hei 9-197336, and Hei 9-197337. U.S. Pat. No. 5,959,781 discloses a technique that an observer is capable of viewing an image on the display surface of an image display means by using a totally reflecting surface and a beam splitter surface to introduce light into a concave mirror so that a magnified virtual image is displayed.

Each of Hei 8-234137, Hei 9-197336, and Hei 9-197337, however, has no means for correcting chromatic aberration because a prism used is made with a single medium.

Thus, chromatic aberration of magnification is undercorrected and it is difficult to obtain high resolution. In each of Hei 9-197336 and Hei 9-197337, the prism is configured to lengthen in a longitudinal direction (Y direction). In the case of U.S. Pat. No. 5,959,781, since the number of parts is large, cost is increased and an assembly is difficult. Furthermore, the problem arises that since a polarization beam splitter is used as a beam splitter to utilize polarization characteristics, a material with very low birefringence, such as glass, must be used as a prism medium and the prism weighs heavy. If the optical system is constructed of plastic material in order to avoid this weight problem, the polarization beam splitter cannot be utilized as the beam splitter and, for example, a half mirror must be used. This construction, however, causes the problem that light from an electronic image is weakened by the surface of the half mirror before the light reaches an observer's eye and hence only a dark image can be observed.

SUMMARY OF THE INVENTION

It is, therefore, an object of the present invention to provide an observing optical system or an imaging optical system which is small in size, lightweight, and bright to such an extent that it can be used in a cellular phone, a personal digital assistant, or a head mounted virtual-image observing apparatus, and which has high resolution.

The optical system according to the present invention is interposed between a pupil plane and an image plane, and includes, at least, a first prism, a second prism, and a holographic element which is sandwiched between the first prism and the second prism and is cemented to these prisms. When a light beam traveling along the optical path connecting the pupil plane and the image plane through the optical system is called a first beam, the first prism has a 1-1 surface placed on the pupil side, combining the function of transmission with the function of reflection of the first beam; a 1-2 surface placed on the opposite side of the pupil with respect to the 1-1 surface; and a 1-3 surface placed on the image side, transmitting the first beam. The second prism includes a 2-1 surface having the same shape as the 1-2 surface and placed opposite thereto, transmitting the first beam at least twice, and a 2-2 surface placed on the opposite side of the pupil with respect to the 2-1 surface of the second prism, reflecting the first beam. The holographic element is designed so that the first beam, when entering the holographic element at a first incident angle, is diffracted and reflected and when entering the holographic element at a second or third incident angle, is transmitted. By doing so, the 1-2 surface of the first prism is designed to combine the function of transmission with the function of reflection of the first beam, and the 1-1 surface of the first prism is designed to be a totally reflecting surface such that when the first beam is incident on the 1-1 surface at an incident angle over a totally reflecting critical angle, it is reflected, while when the first beam is incident at an incident angle below the critical angle, it is transmitted. Whereby, the 1-1 surface combines the function of reflection with the function of transmission.

This and other objects as well as the features and advantages of the present invention will become apparent from the following detailed description of the preferred embodiment when taken in conjunction with the accompanying drawings.

BRIEF DESCRIPTION OF THE DRAWINGS

FIG. 9 is an aberration diagram showing image distortion in the first embodiment;

FIGS. 10A–10L are aberration diagrams showing transverse aberrations in the first embodiment;

FIG. 25 is a view showing a preferred construction where the volume hologram is placed in prisms constituting the optical system of the present invention.

DETAILED DESCRIPTION OF THE PREFERRED EMBODIMENTS

Figure 1A:
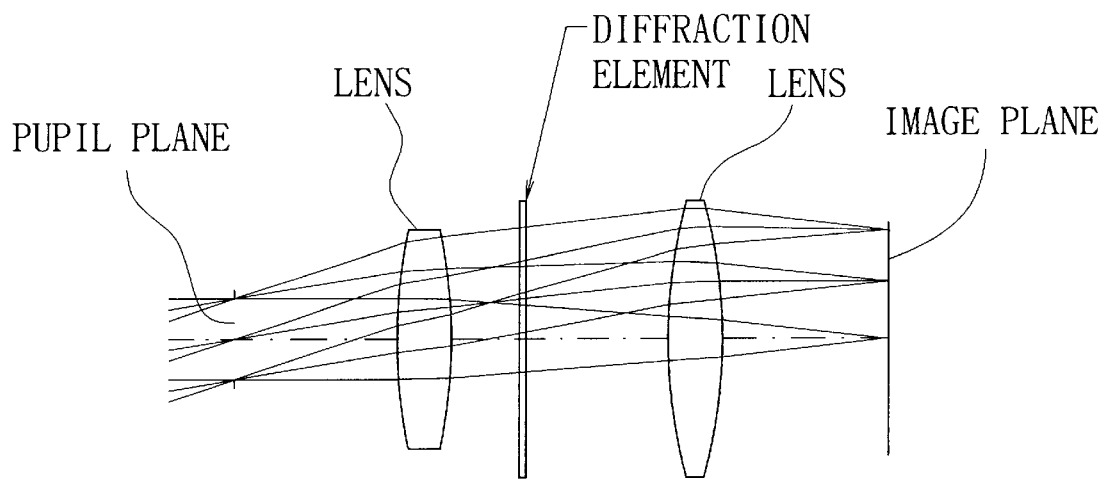
FIGS. 1A and 1B are views for explaining the principle of the relationship between a diffraction element interposed between the image plane and the pupil plane of an optical system and the effect of correction for aberration.

The observing optical system of the present invention includes the optical system mentioned above. In this observing optical system, an image display element for displaying an image observed by an observer is located at the image plane and an exit pupil is formed so that an observer's eye is situated at the pupil plane. The first beam emanating from the image display element is at least transmitted through the 1-3 surface to enter the first prism, and upon entering the 1-2 surface at the first incident angle, is diffracted and reflected by the holographic element. The first beam is then totally reflected by the 1-1 surface and is incident at the second incident angle on the 1-2 surface. Whereby, the first beam is transmitted through the holographic element to emerge once from the first prism, and after being transmitted through the 2-1 surface to enter the second prism, is reflected by the 2-2 surface and the 2-1 surface at the third incident angle. Subsequently, the beam is transmitted through the holographic element to emerge from the second prism and passes through the 1-2 surface. By entering again the first prism and passing through the 1-1 surface, the beam leaves the first prism and is introduced toward the exit pupil.

For example, in a virtual-image observing apparatus with a positive refracting power, as a whole, in which the exit pupil is formed to observe the electronic image displayed on the image display, the image observing optical system of the present invention is comprised of the first prism and the second prism. The first prism is constructed with a rotational asymmetrical refracting surface, a rotational symmetrical or asymmetrical surface having the functions of total reflection and transmission on the exit pupil side, and a surface that a volume hologram element is placed on a cylindrical substrate or a planar substrate. The second prism is constructed with an entrance surface configured like the surface of the first prism that a volume hologram element is placed on a cylindrical substrate or a planar substrate and a rotational symmetrical or asymmetrical reflecting surface.

In this case, the 1-2 surface of the first prism and the 2-1 surface of the second prism are configured as flat surfaces, and the holographic element is cemented to these flat surfaces and sandwiched between them. Alternatively, the 1-2 surface of the first prism and the 2-1 surface of the second prism are configured as curved surfaces, and the holographic element is cemented to these curved surfaces and sandwiched between them. The holographic element cemented to the 1-2 surface and the 2-1 surface is constructed with a volume hologram that has a rotational asymmetrical power.

When the volume hologram with a rotational asymmetrical power is placed on the 1-2 surface and the 2-1 surface, rotational asymmetrical, chromatic aberration of magnification of each prism produced by the curved surface decentered with respect to the optical axis can be corrected, and therefore an image display with high resolution becomes possible.

It is generally known that a diffraction optical element with a large angle of diffraction is difficult to produce because the pitch of a grating structure inside the element is small. The volume hologram element in the present invention, however, is provided for purposes of splitting the optical path and correcting chromatic aberration of magnification, and is easy to produce since a reflection at the angle of diffraction is close to a regular reflection and the optical power can be made low.

A photosensitive material for the volume hologram element supplied like a planar film can be bent with comparative ease into a cylindrical shape, but it is difficult to fabricate the material into a substrate configuration with curvatures in X and Y directions. Thus, in the present invention, when the volume hologram is placed on a prism surface configured into a planar shape, as a substrate, a construction which is easy in production can be employed.

In the present invention, when the volume hologram is placed on the prism surface configured into a cylindrical shape, as a substrate, it becomes possible to correct distortion more favorably in the Y direction and telecentricity in the Y direction.

As in the present invention, when the volume hologram with a rotational asymmetrical power is placed on the 1-2 surface and the 2-1 surface, chromatic aberration of magnification is corrected at the position where a principal ray at each field angle is separated and thus it can be corrected with a high degree of accuracy and great ease. This will be explained below, using FIGS. 1A and 1B.

Figure 1B:
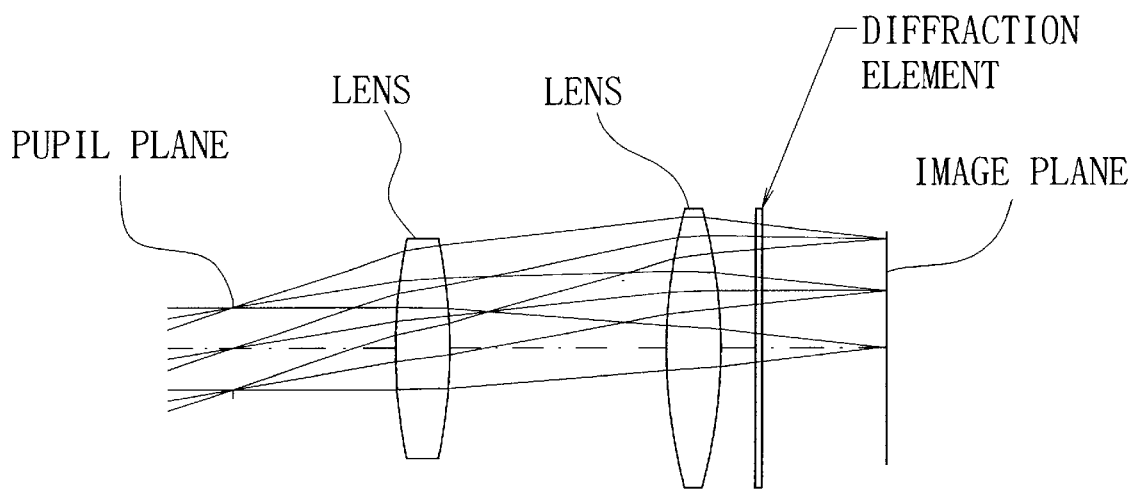

FIGS. 1A and 1B show the principle of the relationship between a diffraction element interposed between the image plane and the pupil plane of an optical system and the effect of correction for aberration. FIG. 1A depicts an arrangement in which the diffraction element lies at a considerable distance away from the image plane. FIG. 1B depicts an arrangement in which the diffraction element is placed close to the image plane. To facilitate a comprehension of the present invention, these figures are drawn so that prisms are replaced with lenses and optical paths are not bent.

In FIG. 1A, the diffraction element is interposed between two lenses, while in FIG. 1B, the diffraction element is interposed between a lens and the image plane. In the case of FIG. 1A, the diffraction element is located at a position where the principal ray at each field angle is not virtually separated, and thus if the diffraction element is designed to have a power for correcting chromatic aberration of magnification of a ray of light at one field angle in the region in which rays of light at a plurality of field angles overlap, chromatic aberration of magnification of a ray of light at another field angle will be produced. In FIG. 1B, by contrast, since the diffraction element is located at a position where the principal ray at each field angle is separated more than in FIG. 1A, the diffraction element can be designed to have a power for correcting chromatic aberration of magnification in a state where rays of light do not overlay, and chromatic aberration of magnification can be corrected with a higher degree of accuracy.

In order to improve the ability to correcting decentering aberration and to correct for rotational asymmetrical distortion and obtain an optical system with good telecentricity, it is conceivable to provide an air space between the first prism and the second prism. In this case, however, it is mechanically difficult to make settings, maintaining the narrowest possible space between the first prism and the second prism in order to minimize the amount of slide of optical path caused by refraction.

In contrast to this, as in the present invention, when the first prism and the second prism are cemented, sandwiching the holographic element between them, there is no need to provide the air space between the prisms. Hence, the adjustment of an air gap in which fine adjustment is difficult becomes unnecessary, which is mechanically advantageous. Furthermore, as mentioned above, the holographic element can be located at the position close to the image plane, and thus even when the prism is provided with a strong curved surface in order to correct distortion, considerable chromatic aberration of magnification produced by the curved surface can be favorably corrected.

In addition, when the optical system is constructed as in the present invention, the holographic element is protected from dust by sandwiching it between the first prism and the second prism, and hence even though a dust-proof member is not provided, it is avoidable that dust particles are magnified and observed. It is also avoidable that the holographic element is expanded by penetration of water into the holographic element from the exterior to change a wavelength at the peak of diffraction efficiency.

In the present invention, it is desirable that a surface of the first prism combining the function of total reflection with the function of refraction, for example, the 1-1 surface, is configured as a rotational asymmetrical surface, such as a free curved surface, in order to correct for rotational asymmetrical distortion and obtain an optical system with good telecentricity. It can also be constructed with a rotational symmetrical surface, such as a spherical, aspherical, or anamorphic surface.

The observing optical system of the present invention, as mentioned above, is such that a beam of light incident on the first prism is incident at the first incident angle on the volume hologram, and after being reflected and diffracted, is incident at a larger incident angle than the totally reflecting critical angle on the pupil-side surface (the 1-1 surface) to satisfy the condition of total reflection, thereby achieving the total reflection. A totally reflected beam is incident again at the second incident angle on the volume hologram. However, since the incident angle is out of the range of angular selectivity of the volume hologram, the diffraction efficiency is extremely impaired, and the beam passes substantially through the volume hologram as it is, emerging therefrom into the second prism.

The beam of light incident on the second prism, after being refracted and reflected by the entrance surface and the reflecting surface thereof, respectively, is incident again at the third incident angle on the volume hologram. However, since the beam is incident at an incident angle which is very different from the first incident angle where the beam is incident before this and is diffracted and reflected and the incident angle is out of the range of angular selectivity of the volume hologram, the diffraction efficiency becomes extremely low, and the beam passes substantially through the volume hologram as it is and is introduced into the first prism. The beam of light incident on the first prism, after being incident at an incident angle below the totally reflecting critical angle on the pupil-side surface (the 1-1 surface), emerges from the first prism and is introduced into an observer's eye.

Thus, in the present invention, when the optical system is constructed so that the totally reflecting surface and the volume hologram are used to separately utilize the function of reflection and the function of transmission of the beam of light, it is not necessary to provide a polarization beam splitter for splitting the optical path, and each of the prisms can be constructed of plastic material which generally has a better birefringent property than in optical glass. As such, a virtual-image observing apparatus which is light in weight and good in productivity can be provided. Moreover, it is not necessary to provide a half mirror for splitting the optical path, and thus a bright electronic image with little loss in the amount of light can be provided to an observer.

As in the present invention, when the beam is passed three times through the prism in the same region between the surface having the function of total reflection and the function of transmission and the surface having the volume hologram, thinness in the direction of thickness (the Z direction) of the optical system and a reduction in the direction of length thereof can be achieved at the same time.

Figure 2:
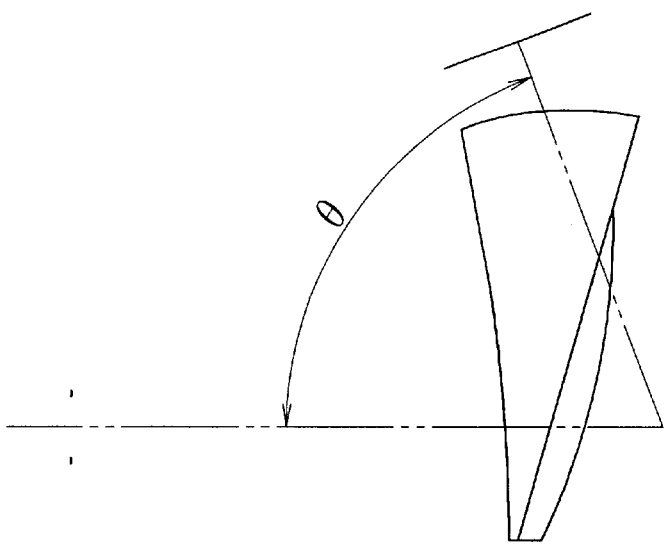
FIG. 2 is an explanatory view showing an angle made by a visual axis with a line perpendicular to the image surface of an image display element in the optical system of the present invention.

In the present invention, a ray connecting the center of the pupil plane and the center of the image plane is taken as an axial principal ray, the extension of the axial principal ray from the position where the ray passes through the exit pupil is taken as a visual axis, and an angle made by the visual axis with a line perpendicular to the image surface of an image display element is represented by θ (see FIG. 2). In this case, it is important that the image display element is placed to satisfy the following condition:

$$40.0° < |\theta| < 100.0° \tag{1}$$

If the angle θ exceeds the upper limit of Condition (1), the angle of inclination of the totally reflecting surface will be increased and the thickness (in the Z direction) of the optical system becomes larger. Consequently, the amount of decentering of the reflecting surface of the second prism is increased, and correction for decentering aberration becomes difficult.

If the angle θ is below the lower limit of Condition (1), it becomes difficult to satisfy the critical condition of the totally reflecting surface.

In the present invention, it is more desirable to satisfy the following condition:

$$60.0°<|\theta|<85.0° \qquad (2)$$

In the present invention, it is further desirable to satisfy the following condition:

$$65.0°<|\theta|<73.0° \qquad (3)$$

In the observing optical system of the present invention, an optical member, such as a prism, a plane-parallel glass, or a positive or negative lens, may be interposed between the 1-3 surface of the first prism and the image display element. In the observing optical system of the present invention, the first prism may be provided with a reflecting surface for reflecting the first beam to introduce it into the 1-2 surface in an optical path from the 1-3 surface to the 1-2 surface.

In the observing optical system of the present invention, the second prism may be provided with a reflecting surface for reflecting the first beam to introduce it into the 2-2 surface in an optical path from the 2-1 surface to the 2-2 surface. These constructions of the present invention are also applicable to the imaging optical system.

The imaging optical system of the present invention, including the above optical system, is constructed so that an image sensor for picking up an image of an object is placed at the image plane, and an aperture stop for adjusting brightness of the beam of light from the object is placed at the pupil plane. The light passing through the aperture stop, at least, is transmitted through the 1-1 surface to enter the first prism and is incident at the third incident angle on the 1-2 surface. The light, after being transmitted through the holographic element and emerging once from the first prism, is transmitted through the 2-1 surface to enter the second prism, and is reflected by the 2-2 surface so that it is incident at the second incident angle on the 2-1 surface. The light is then transmitted through the holographic element and emerges from the second prism. Subsequently, the light passes through the 1-2 surface to enter again the first prism, and after being totally reflected by the 1-1 surface, is incident at the first incident angle on the 1-2 surface. Consequently, the light is diffracted and reflected by the holographic element and is transmitted through the 1-3 surface so that it leaves the first prism and is introduced into the image sensor.

Specifically, the image display element for displaying an image observed by an observer and the exit pupil in the observing optical system of the present invention are replaced by the image sensor for picking up the object image and the aperture stop for adjusting the brightness of the beam of light from the object, respectively, and thereby the imaging optical system of the present invention is constructed.

In the imaging optical system also, it is favorable to have the construction corresponding to the observing optical system in relation to, for example, the above conditions.

In the imaging optical system of the present invention, when the medium of the second prism is constructed of a liquid and the reflecting surface of the second prism is configured as a deformable mirror, the second prism can also be used as a focusing mechanism of the imaging optical system.

The observing optical system of the present invention may be constructed so that the 2-2 surface of the second prism is a totally reflecting surface that reflects the beam of light when it is incident at incident angle exceeding the totally reflecting critical angle on the 2-2 surface, and transmits the beam when it is incident at an incident angle below the totally reflecting critical angle on the surface. The optical system may also be provided with an optical member for transmitting light on the 2-2 surface side.

When the optical system is constructed as mentioned above, a see-through observation becomes possible, and since a head or face mounted image display using the observing optical system of the present invention can be mounted without any obstruction to an ordinary external observation, time for mounting or dismounting the image display is saved.

A multiple image in which an external observation image and an image from the image display element are superposed can also be observed. Also, where such see-through observations can be made, an optical member provided on the 2-2 surface side of the second prism is constructed of a transparent member such as glass or plastic. In order to make the see-through observations, the 2-2 surface may be constructed with a half mirror.

A head mounted image display can be designed to have an image display element, a body section in which the observing optical system of the present invention mentioned above is placed as an ocular optical system, a supporting member for supporting the body section on an observer's head so that the exit pupil of the observing optical system is retained at the position of the observer's eye, and a speaker member for providing a sound to the observer's ear.

The head mounted image display in this case may also be designed so that the body section has an observing optical system for the right eye and an observing optical system for the left eye and the speaker member is provided with a speaker for the right ear and a speaker for the left ear.

In the head mounted image display, the speaker member may also be constructed with an earphone.

In the optical system of the present invention, when a ray of light traveling through the center of an object point and passing through the center of the pupil in the observing optical system, or the center of the aperture stop in the imaging optical system, to reach the center of the image plane, using reverse ray tracing in the observing optical system or forward ray tracing in the imaging optical system, is taken as an axial principal ray, at least one reflecting surface is decentered with respect to the axial principal ray. Otherwise, the incident ray of the axial principal ray and a reflected ray will follow the same path, and the axial principal ray will be blocked in the optical system. Consequently, an image is formed by only a beam blocked at its center and, for example, the center of the image becomes dark or the image ceases to be formed at the center at all. As such, a decentering prism is used for a prism in the present invention.

When a reflecting surface with a power is decentered with respect to the axial principal ray, it is desirable that at least one of surfaces constituting a prism member used in the present invention is rotational asymmetrical. In particular, it is favorable for correction for aberration that at least one reflecting surface of the prism member is rotational asymmetrical.

In order to bend the optical path to doubly utilize the optical path in a common region, it is necessary to decenter the optical system. However, when the optical system is constructed as a decentering optical system to bend the optical path, decentering aberration, such as rotational asymmetrical distortion or rotational asymmetrical curvature of field, is produced. In order to correct such decentering aberration, the rotational asymmetrical surface is used as mentioned above.

For the same reason, it is desirable that the surface with a power of the holographic element used in the present invention is also rotational asymmetrical.

A base on which the holographic element is provided may be configured into any of shapes, such as spherical, aspherical, anamorphic, and toric surfaces, a surface with only one symmetrical plane, and a surface-symmetrical free curved surface, in addition to the planar and cylindrical surfaces mentioned above.

The rotational asymmetrical surface used in the present invention can be constructed with an anamorphic surface, a toric surface, or a surface-symmetrical free curved surface with only one symmetrical plane, preferably with a free curved surface with only one symmetrical plane.

In the present invention, the axial principal ray is defined as a ray passing through the center of the exit pupil and reaching the center of the image display element, using the reverse ray tracing in the observing optical system, or a ray passing through the center of the aperture stop and reaching the center of the image sensor, using the forward ray tracing in the imaging optical system. An optical axis formed by the extension of the axial principal ray from the center of the exit pupil or the aperture stop to the exit-pupil-side surface of the first prism is defined as the Z axis, an axis inside a decentering plane of each of surfaces perpendicular to the Z axis and constituting the first prism is defined as the Y axis, and an axis perpendicular to the Z and Y axes is defined as the X axis. The center of the exit pupil or the aperture stop is assumed to be the origin of a coordinate system in the observing optical system or the imaging optical system of the present invention. In the present invention, the surface number is used in accordance with the reverse ray tracing in which light travels from the exit pupil toward the image display element or the forward ray tracing in which light travels from the aperture stop toward the image sensor. A direction in which the axial principal ray travels from the exit pupil to the image display element, or from the aperture stop to the image sensor, is defined as a positive direction of the Z axis, the direction of the Y axis in which the ray travels toward the image display element, or toward the image sensor, is defined as a positive direction of the Y axis, and the direction of the X axis which constitutes the Y axis, the Z axis, and the right-handed coordinate system is defined as a positive direction of the X axis.

Here, the configuration of the free curved surface used in the present invention is defined by the following equation. Also, the Z axis in this equation is the axis of the free curved surface.

$$Z = cr^2/[1 + \sqrt{1 - (1+k)c^2 r^2}] + \sum_{j=2}^{66} C_j X^m Y^n \quad (4)$$

where the first term of Eq. (4) is a spherical surface term and the second term is a free curved surface term. In the spherical surface term, c is a curvature at the vertex of the surface, k is a conic constant, and $r = \sqrt{X^2 + Y^2}$.

The free curved surface term can be developed as follows:

$$\sum_{j=2}^{66} C_j X^m Y^n = C_2 X + C_3 Y + C_4 X^2 + C_5 XY + C_6 Y^2 + \quad (5)$$
$$C_7 X^3 + C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 + C_{17} X^4 Y +$$
$$C_{18} X^3 Y^2 + C_{19} X^2 Y^3 + C_{20} XY^4 + C_{21} Y^5 + C_{22} X^6 +$$
$$C_{23} X^5 Y + C_{24} X^4 Y^2 + C_{25} X^3 Y^3 + C_{26} X^2 Y^4 +$$
$$C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7$$

where $C_j$, j is an integer of 2 or more) is a coefficient.

In general, the free curved surface has no symmetrical plane in each of the X-Z plane and the Y-Z plane. However, in the present invention, all the odd orders of X are made zero and thereby a free curved surface which has only one symmetrical plane parallel to the Y-Z plane is obtained. Such a free curved surface can be achieved, for example, by setting the coefficients of terms of $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . at zero in Eq. (4).

All the odd orders of Y are made zero and thereby a free curved surface which has only one symmetrical plane parallel to the X-Z plane is obtained. Such a free curved surface can be achieved, for example, by setting the coefficients of terms of $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . at zero in Eq. (4).

One of the directions of the above symmetrical planes is set to a symmetrical plane so that decentering in a corresponding direction, for example, the decentering of the optical system relative to a symmetrical plane parallel with the Y-Z plane is set in the direction of the Y axis, and the decentering of the optical system relative to a symmetrical plane parallel with the X-Z plane is set in the direction of the X axis. In this way, rotational asymmetrical aberration produced by the decentering is effectively corrected and at the same time, productivity can be improved.

Eq. (4) is cited as one example as described above, and has the feature that in the present invention, by using the rotational asymmetrical surface with only one symmetrical plane, rotational asymmetrical aberration produced by the decentering is corrected and at the same time, productivity is improved. However, it is needless to say that any definition equation other than Eq. (4) brings about the same effect.

In the present invention, the reflecting surface provided in the prism member can be configured as a surface-symmetrical free curved surface with only one symmetrical plane.

The configuration of the anamorphic surface is defined by the following equation. Also, a line going through the origin of the surface configuration, perpendicular to an optical surface is the axis of the anamorphic surface.

$$Z = (Cx \cdot X^2 + Cy \cdot Y^2)/[1 + \{1 - (1+Kx)Cx^2 \cdot X^2 - (1+Ky)Cy^2 \cdot Y^2\}^{1/2}] + \Sigma Rn\{(1-Pn)X^2 + (1+Pn)Y^2\}^{(n+1)} \quad (6)$$

Here, when n=4 is considered as an example, Eq. (6), when developed, can be expressed by the following equation:

$$Z = (Cx \cdot X^2 + Cy \cdot Y^2)/[1 + \{1 - (1+Kx)Cx^2 \cdot X^2 - (1+Ky)Cy^2 \cdot Y^2\}^{1/2}]$$
$$+ R1\{(1-P1)X^2 + (1+P1)Y^2\}^2$$
$$+ R2\{(1-P2)X^2 + (1+P2)Y^2\}^3$$

$$+R3\{(1-P3)X^2+(1+P3)Y^2\}^4$$

$$+R4\{(1-P4)X^2+(1+P4)Y^2\}^5 \quad (7)$$

where Z is the amount of shift from a contact surface relative to the origin of the surface configuration, Cx is a curvature in the direction of the X axis, Cy is a curvature in the direction of the Y axis, Kx is a conic constant in the direction of the X axis, Ky is a conic constant in the direction of the Y axis, Rn is a rotational symmetrical component of the spherical surface term, and Pn is a rotational asymmetrical component of the asymmetrical surface term. Also, a radius of curvature Rx along the X axis, a radius of curvature Ry along the Y axis, and the curvatures Cx and Cy have the relations of Rx=1/Cx and Ry=1/Cy.

The toric surfaces are available in an X toric surface and a Y toric surface, and a line going through the origin of the surface configuration, perpendicular to the optical surface is the axis of the toric surface.

The configuration of the X toric surface is expressed by the following equation:

$$F(X)=Cx\cdot X^2/[1+\{1-(1+K)Cx^2X^2\}^{1/2}]+AX^4+BX^6+CX^8+DX^{10}$$

$$Z=F(X)+(\tfrac{1}{2})Cy\{Y^2+Z^2-F(X)^2\} \quad (8)$$

The configuration of the Y toric surface is expressed by the following equation:

$$F(Y)=Cy\cdot X^2/[1+\{1-(1+K)Cy^2\cdot Y^2\}^{1/2}]+AY^4+BY^6+CY^8+DY^{10}$$

$$Z=F(Y)+(\tfrac{1}{2})Cx\{X^2+Z^2-F(Y)^2\} \quad (9)$$

where K is a conic constant and A, B, C, and D are aspherical coefficients.

Two types of holographic elements are available: one, a relief hologram and the other, a volume hologram. The relief hologram has the features that an incident-angle selectivity or a wavelength selectivity is low and light with a particular incident angle and wavelength is diffracted and imaged as necessary order light, but light with other incident angles ad wavelengths is also diffracted at reduced diffraction efficiency and is imaged as unwanted order light. The volume hologram, on the other hand, has the properties that the incident-angle selectivity or wavelength selectivity is high and only light with a particular wavelength and incident angle is diffracted and imaged as necessary order light, but most of other light is transmitted as zero order light so that unwanted order light is not virtually imaged.

Thus, as in the present invention, when a reflection type volume hologram is used as the holographic element in the first prism, the blurring of an image caused by unwanted order light can be obviated and a sharp observation image can be obtained.

Figure 3:
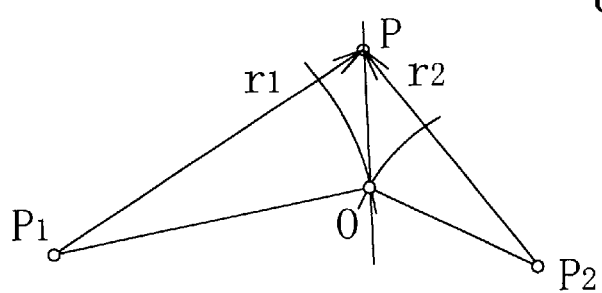
FIG. 3 is a view showing a principle for defining a volume hologram in the present invention.

The volume hologram (HOE) which is the holographic element in the present invention is defined as follows: FIG. 3 shows a principle for defining the HOE in the present invention.

The ray tracing of a wavelength $\lambda$ which is incident on the surface of the HOE and then emerges therefrom is given by the following equation, using a path difference function $\phi_0$ on the surface of the HOE defined with respect to a reference wavelength $\lambda_0$=HWL:

$$n_d Q_d \cdot N = n_i Q_i \cdot N + m(\lambda/\lambda_0)\nabla\phi_0 \cdot N \quad (10)$$

where N is a normal vector on the surface of the HOE, $n_i(n_d)$ is a refractive index on the incidence side (emergence side), and $Q_I$ ($Q_d$) is an incidence (emergence) vector in vectors. Also, m=HOR is the diffraction order of emergent light.

If the HOE is fabricated (defined) by interference between two point sources with the reference wavelength $\lambda_0$, that is, as illustrated in FIG. 3, object light with a light source at a point $P_1$=(HX1, HY1, and HZ1) and reference light with a light source at a point $P_2$=(HX2, HY2, and HZ2), the result is as follows:

$$\phi_0\phi_0^{2P}=n_2\cdot s_2\cdot r_2-n_1\cdot s_1\cdot r_1$$

where $r_1$ ($r_2$) is a distance (>0) from the point $P_1$ ($P_2$) to predetermined coordinates on the surface of the HOE and $n_1$ ($n_2$) is a refractive index of a medium in which the HOE is placed in fabrication (definition), on the side of the point $P_1$ ($P_2$). Also, $s_1$=HV1 and $s_2$=HV2 are signs considering the traveling direction of light. When the light source is a divergent source (real point source), the sign becomes REA=+1, while when it is a convergent source (virtual point source), the sign becomes VIR=−1. The refractive index $n_1$ ($n_2$) of the medium in which the HOE is placed in fabrication (definition), as the definition of the HOE in lens data, is assumed to be the refractive index of the medium with which the HOE comes into contact in the lens data, on the side of the point $P_1$ ($P_2$).

In general, each of the reference light and the object light relative to the fabrication of the HOE is not necessarily be a spherical wave. The path difference function $\phi_0$ of the HOE in this case, with an additional phase term $\phi_0^{Poly}$ (a path difference function relating to the reference wavelength $\lambda_0$) given by a polynomial, can be expressed by the following equation:

$$\phi_0=\phi_0^{2P}+\phi_0^{Poly} \quad (11)$$

Here, the polynomial is given by $$\Phi_0^{Poly} = \sum_j H_j \cdot x^m \cdot y^n$$
$$= H_1 x + H_2 y + H_3 x^2 + H_4 xy + H_5 y^2 +$$
$$H_6 x^3 + H_7 x^2 y + H_8 xy^2 + H_9 y^3 + \ldots$$

and in general is defined by $$j=\{(m+n)^2+m+3n\}/2$$

where $H_j$ is the coefficient of each term.

For convenience of optical design, the path difference function $\phi_0$ is expressed by only the additional term as $$\phi_0=\phi_0^{Poly}$$

and thereby the HOE can also be defined. For example, when the two point sources $P_1$ and P2 are made to coincide, the component $\phi_0^{2P}$ produced by the interference of the path difference function $\phi_0$ becomes zero, and thus this corresponds substantially to that the path difference function is expressed by only the additional term (polynomial).

The above description of the HOE is related to local coordinates on the basis of the origin of the HOE.

The following are examples of constituent parameters for defining the HOE.

| Surface number | Radius of curvature | Distance |
|---|---|---|
| Object surface | ∞ | ∞ |
| Stop | ∞ | 100 |
| 2 | 150 | −75 |

Figure 4:
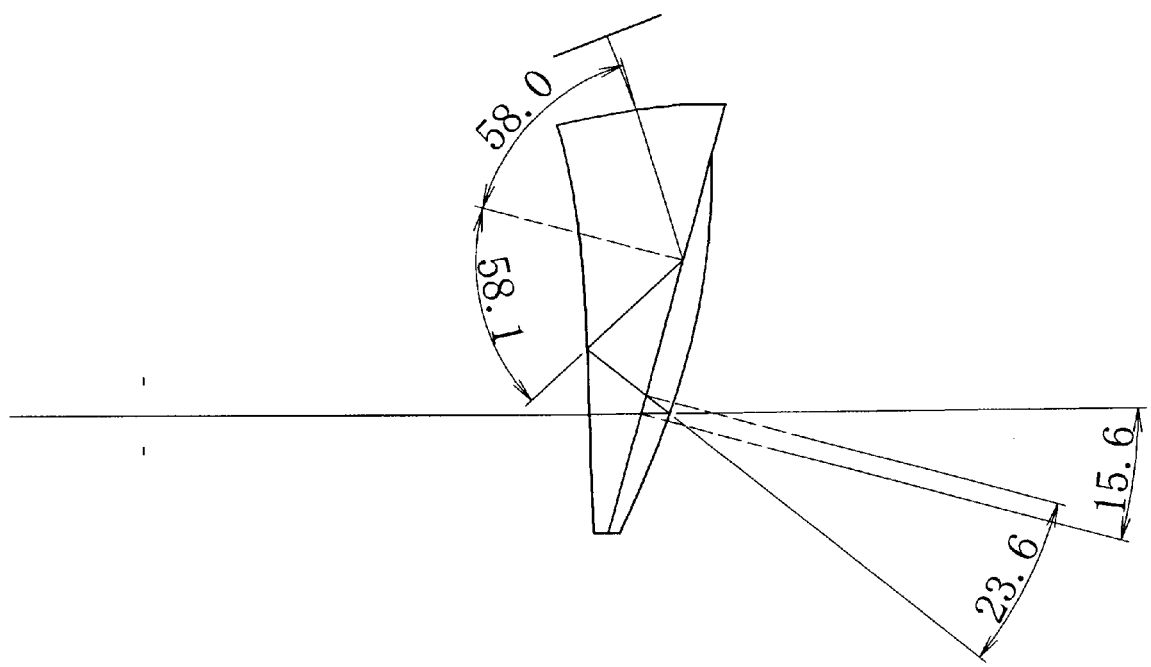
FIG. 4 is a view for explaining the calculation condition of diffraction efficiency relating to the surface of the volume hologram in the present invention.
Figure 5:
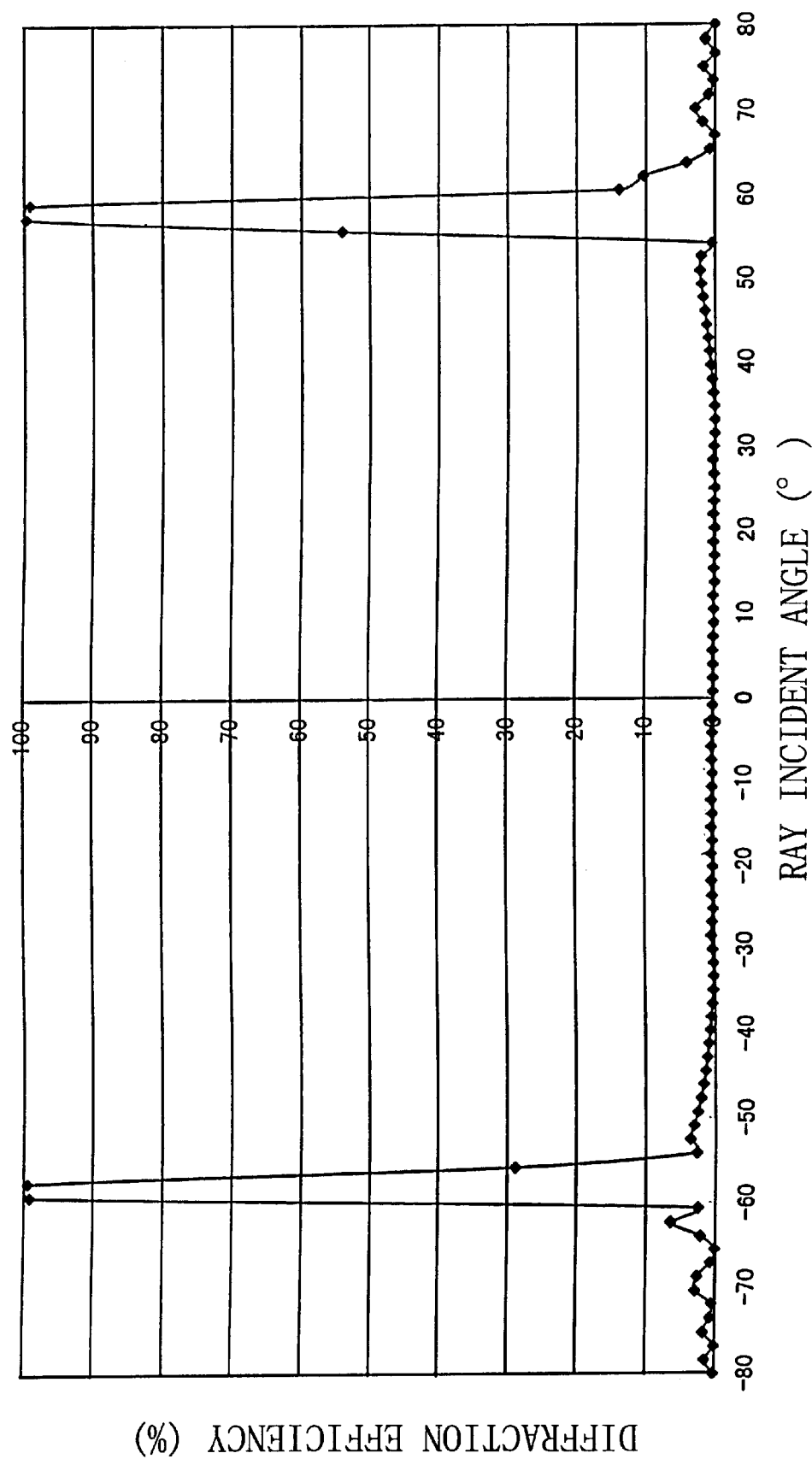
FIG. 5 is a graph showing the diffraction efficiency against the angle of incidence of an axial principal ray with a wavelength of 520 nm on the surface of the volume hologram, within the range of incident angles of ±80°, in the present invention.
Figure 6:
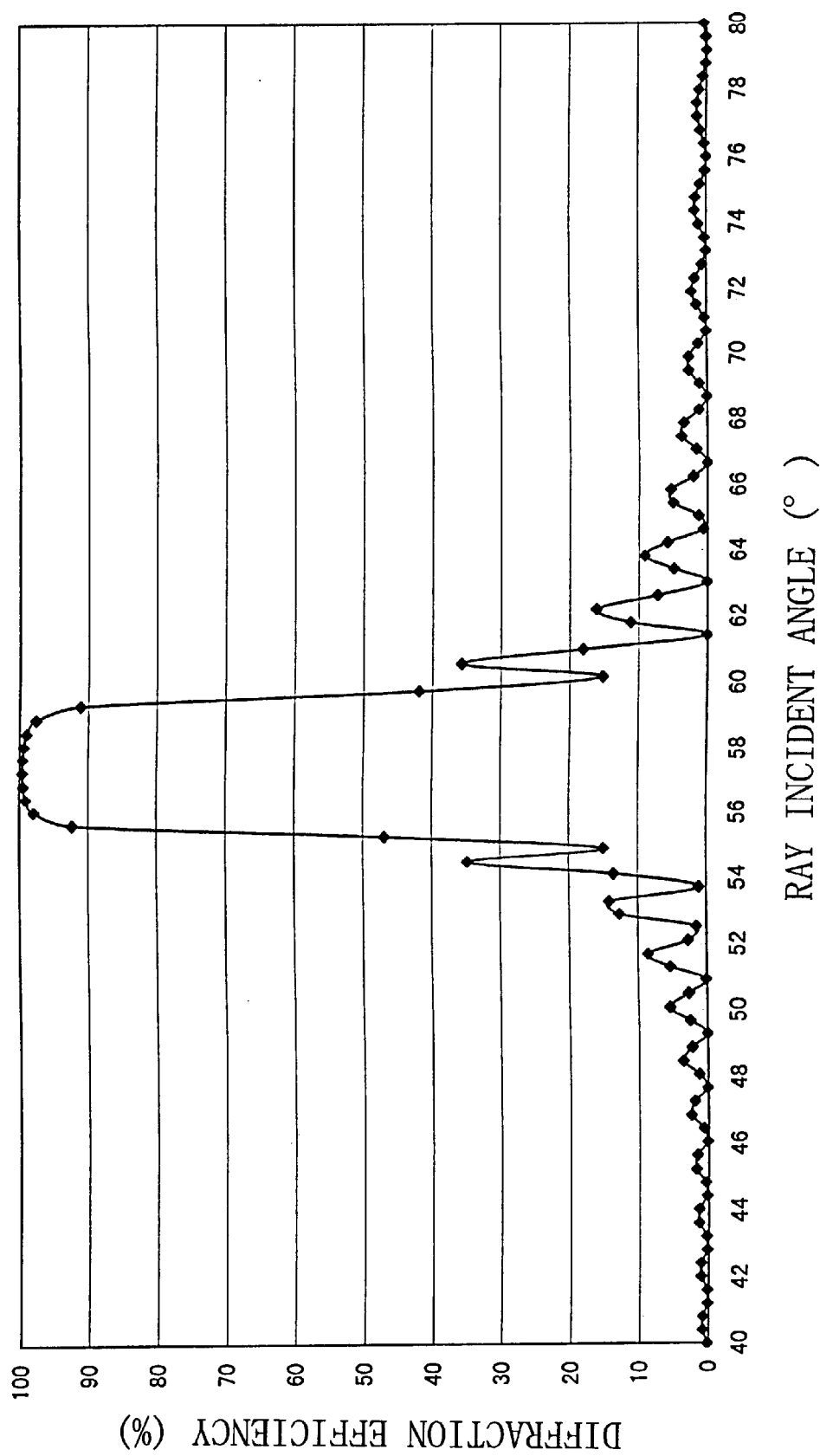
FIG. 6 is a graph showing the diffraction efficiency against the angle of incidence of an axial principal ray with a wavelength of 520 nm on the surface of the volume hologram, within the range of incident angles of 40–80°, in the present invention.
Figure 7:
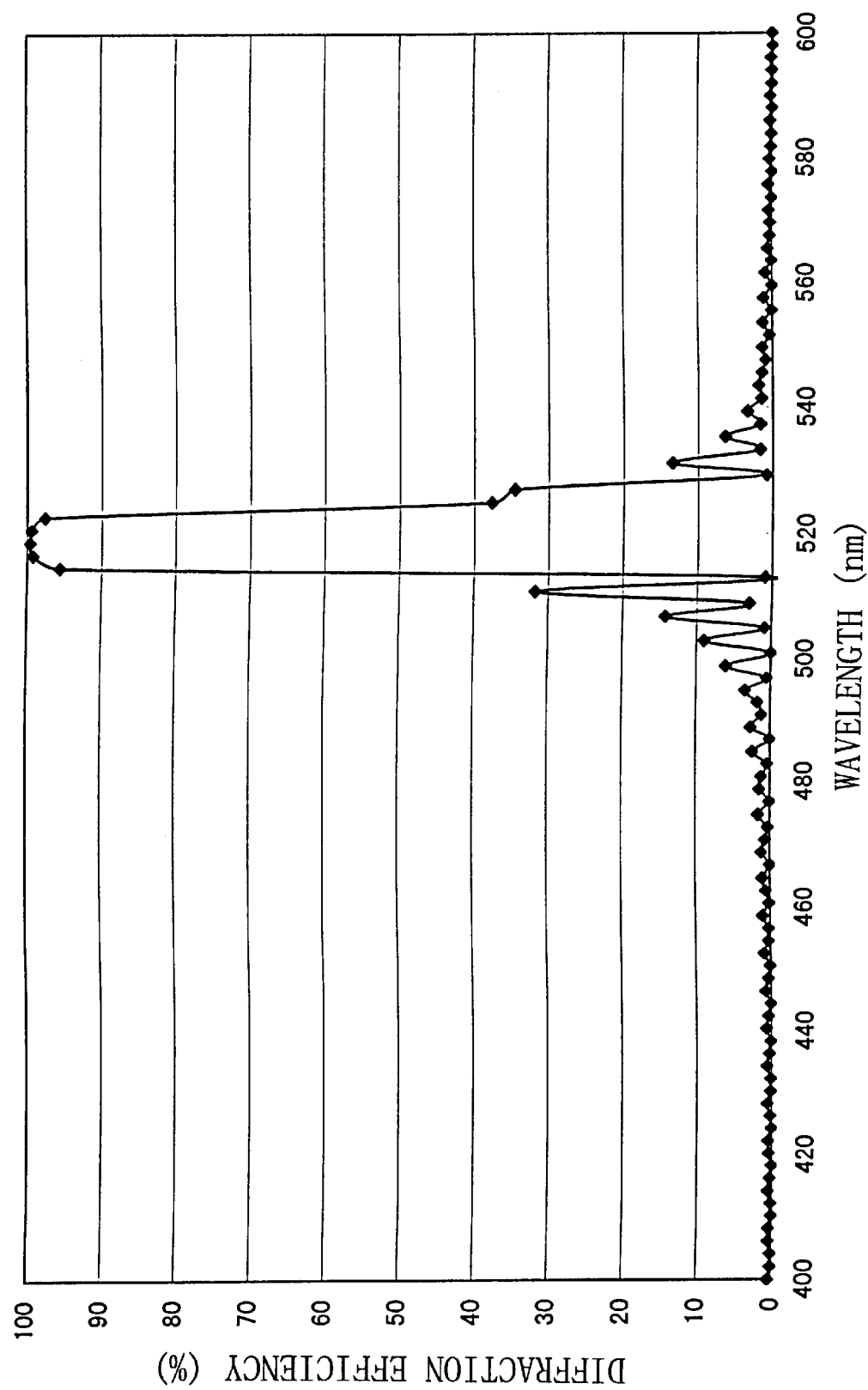
FIG. 7 is a graph showing the diffraction angle of the axial principal ray incident at angle of 58.0° on the surface of the volume hologram versus the wavelength, in the present invention.

HOE:
HV1 ($s_1$)=REA(+1)
HV2($s_2$)=VIR(−1)
HOR(m)=1
HX1=0, HY1=−3.40×10$^9$, HZ1=−3.40×10$^9$
HX2=0, HY2=2.50×10, HZ2=−7.04×10
HWL($\lambda_0$)=544
H1=−1.39×10$^{-21}$, H2=−8.57×10$^{-5}$, H3=−1.50×10$^{-4}$ Subsequently, a description will be given of principles of reflection-diffraction and transmission of the surface of the volume hologram used in the present invention. The simulation of diffraction efficiency is shown by simulating the diffraction efficiency of a polarized component of p light on the basis of the Kogelnik theory. FIG. 4 illustrates the calculation condition of diffraction efficiency. A narrow-band-pass filter is used in an LED light source with center wavelengths of 630 nm, 520 nm, and 470 nm for light of R, G, and B bands to reduce each of the band widths to a center wavelength of ±5–10 nm. As an example is cited the calculation result of diffraction efficiency on the surface of the volume hologram relative to the axial principal ray of the G band. Also, a reference refractive index is takes as 1.5 and a refraction-diffraction angle is taken as 0.05. The diffraction efficiencies where the angle of incidence of the axial principal ray on the surface of the volume hologram is set at 58.0° and a reflection-diffraction angle is set at 58.1° are shown in FIGS. 5–7. Each of FIGS. 5 and 6 shows a graph of the diffraction efficiency versus the incident angle of the axial principal ray with a wavelength of 520 nm. FIG. 7 shows a graph of the diffraction angle of the axial principal ray incident at an angle of 58.0° versus the wavelength.

From FIGS. 5 and 6, it is found that the axial principal ray with a wavelength of 520 nM is capable of attaining a diffraction efficiency of about 100% within the range of incident angles of ±58.0°. From FIG. 7, it is also found that a good reflection-diffraction efficiency is obtained within the range of wavelengths of 500±5 nm. When the axial principal ray, after being reflected and diffracted, is totally reflected by the 1-1 surface and enters again the volume hologram, it is assumed to be incident at angle of 23.6° thereon. After that, the axial principal ray, when reflected by the 2-2 surface of the second prism and entering again the volume hologram, is assumed to be incident at an angle of 15.6° thereon. From FIG. 5, it is seen that the axial principal ray with a wavelength of 520 nm, incident at respective angles of ±23.6° and ±15.6° on the region of the surface of the volume hologram that possesses properties the angles of incidence and diffraction, has low diffraction efficiency and passes through the hologram as it is.

Also, in the embodiments to be described later, it is assumed that an incident angle of 58.0° is a first angle of incidence on the volume hologram, an incident angle of 23.6° is a second angle of incidence on the volume hologram, and an incident angle of 15.6° is a third angle of incidence on the volume hologram.

Figure 8:
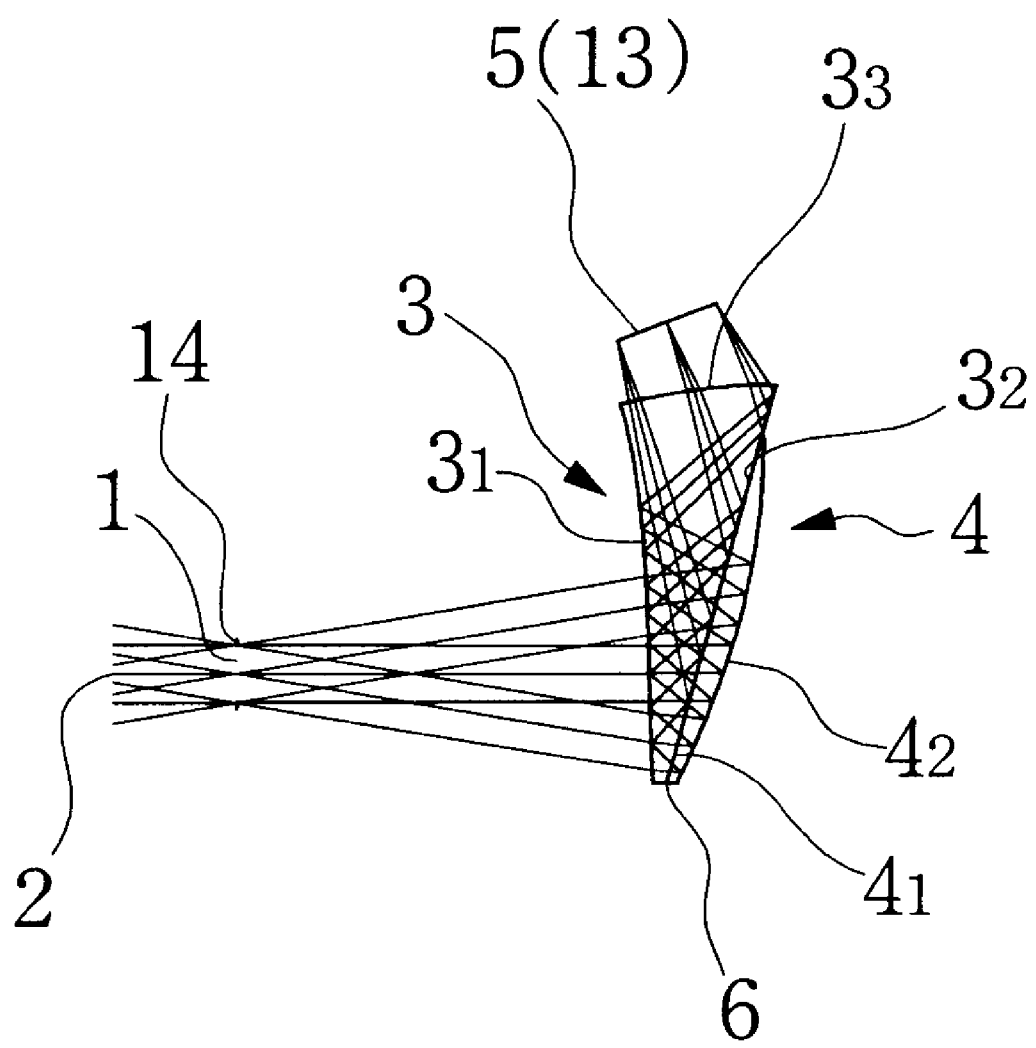
FIG. 8 is a view showing a Y-Z section containing the optical axis of an optical system according to a first embodiment in the present invention.

The embodiments of the observing optical system and the imaging optical system of the present invention will be described below. The constituent parameters of the embodiments are shown later. In each of the embodiments, for example, as shown in FIG. 8, an axial principal ray 2 is defined as a ray of light extending from the center (the center position of an observer's eye) of an exit pupil 1 (or an aperture stop 14), through a first prism 3 and a second prism 4, to the center of an LCD 5 provided as an image display element (or an image sensor 13). An optical axis formed by the extension of the axial principal ray 2 from the center of the exit pupil 1 to the exit-pupil-side surface of the first prism 3 is defined as the Z axis, an axis inside a decentering plane of each of surfaces perpendicular to the Z axis and constituting the first prism is defined as the Y axis, and an axis perpendicular to the Z and Y axes is defined as the X axis. The center of the exit pupil 1 (or the aperture stop 14) is assumed to be the origin of a coordinate system. A direction in which the axial principal ray 2 travels from the exit pupil 1 (or the aperture stop 14) to the LCD 5 (or the image sensor 13) is defined as a positive direction of the Z axis, the direction of the Y axis in which the ray travels toward the LCD 5 (or the image sensor 13) is defined as a positive direction of the Y axis, and the direction of the X axis which constitutes the Y axis, the Z axis, and the right-handed coordinate system is defined as a positive direction of the X axis.

In each of the embodiments, the first prism and the second prism are decentered in an Y-Z plane, and only one symmetrical plane of each of rotational asymmetrical free curved surfaces provided in the first prism and the second prism is constructed with this Y-Z plane.

A decentering surface is provided with the amount of decentering (in which the directions of the X axis, the Y axis, and the Z axis are taken as X, Y, and Z, respectively) at the vertex of the surface, form the origin of the corresponding coordinate system, and angles of inclination ($\alpha$, $\beta$, and $\gamma$(°)), with the X axis, the Y axis, and the Z axis at the center axis of the surface (the Z axis of Eq. (4) for the free curved surface). In this case, the positive sign of each of the angles $\alpha$ and $\beta$ means counterclockwise rotation with respect to the positive direction of each axis, and the positive sign of the angle $\gamma$ means clockwise rotation with respect to the positive direction of the Z axis. The applications of the radius of curvature of a spherical surface, a surface-to-surface spacing, the refractive index of a medium, and the Abbe's number observe a common practice.

The configuration of the free curved surface used in the present invention is defined by Eq. (4), and the Z axis of this equation is the axis of the free curved surface.

As another equation for definition of the free curved surface, a Zernike's polynomial is available. The configuration of this surface is defined by the following equations. The Z axis described in these equations is the axis of the Zernike's polynomial. The rotational asymmetrical surface is defined by polar coordinates of the X-Y plane versus the height of the Z axis. Reference symbol R represents a distance from the Z axis in the X-Y plane and A represents an azimuth angle around the Z axis, expressed by the angle of rotation measured from the Y axis.

$X = R \times \cos(A)$ $Y = R \times \sin(A)$ $Z = D_2$ $+ D_3 R \cos(A) + D_4 R \sin(A)$ $+ D_5 R^2 \cos(2A) + D_6 (R^2 - 1) + D_7 R^2 \sin(2A)$ $+ D_8 R^3 \cos(3A) + D_9 (3R^3 - 2R) \cos(A)$ $+D_{10}(3R^3-2R)\sin(A)+D_{11}R^3\sin(3A)$ $+D_{12}R^4\cos(4A)+D_{13}(4R^4-3R^2)\cos(2A)$ $+D_{14}(6R^4-6R^{2+1})+D_{15}(4R^4-3R^2)\sin(2A)$ $+D_{15}R^4\sin(4A)$ $+D_{17}R^5\cos(5A)+D_{18}(5R^5-4R^3)\cos(3A)$ $+D_{19}(10R^5-12R^3+3R)\cos(A)$ $+D_{20}(10R^5-12R^3+3R)\sin(A)$ $+D_{21}(5R^5-4R^3)\sin(3A)+D_{22}R^5\sin(5A)$ $+D_{23}R^6\cos(6A)+D_{24}(6R^6-5R^4)\cos(4A)$ $+D_{25}(15R^6-20R^4+6R^2)\cos(2A)$ $+D_{26}(20R^6-30R^4+12R^2-1)$ $+D_{27}(15R^6-20R^4+6R^2)\sin(2A)$ $+D_{28}(6R^6-5R^4)\sin(4A)+D_{29}R^6\sin(6A)$ \hfill (12)

In the above description, the free curved surface is expressed as a surface symmetrical with respect o the x direction. Here, $D_m$ (where m is an integer of 2 or more) is a coefficient.

The configuration of the rotational asymmetrical free curved surface can also be defined by the following equation. The Z axis of this equation is the axis of the rotational asymmetrical surface.

$$Z=\Sigma_n\Sigma_m C_{n\,m}X^n Y^{n-m} \qquad (13)$$

where the subscript n on Σ denotes 0–k and the subscript m on Σ denotes 0–n.

When the surface-symmetrical free curved surface (a rotational asymmetrical surface with only one symmetrical plane) is defined by Eq. (13) representative of the rotational asymmetrical surface, it is only necessary to set the odd order of X to zero (for example, to set the coefficient of X with the odd order to zero) where symmetry produced by the symmetrical plane is required in the x direction and to set the odd order of Y to zero (for example, to set the coefficient of Y with the odd order to zero) where symmetry produced by the symmetrical plane is required in the Y direction.

The configuration of the rotational symmetrical aspherical surface id defined by the following equation. The Z axis of this equation is the axis of the rotational symmetrical aspherical surface.

$$Z=(Y_2/R)/[1+\{1-P(Y^2/R^2)\}^{1/2}]+A_4Y^4+A_6Y^6+A_8Y^8+A_{10}Y^{10} \qquad (14)$$

where Y is perpendicular to Z, R is a paraxial radius of curvature, P is a conic constant, and $A_4, A_6, A_8,$ and $A_{10}$, are aspherical coefficients.

Also, although in the embodiments of the present invention the surface configuration is represented by the free curved surface using Eq. (4), it is needless to say that even when Eq. (12) or (13) is used, the same function and effect are brought about. Each of the first and second embodiments is explained as the observing optical system. The image display element used is an LCD which has dimensions of 9.6 mm by 7.2 mm of a 0.47-inch type and a diopter of –1.0 D. For the angle of view, a horizontal half angle of view is 12.5° and a vertical half angle of view is 9.44°. The pupil diameter is 4.0 mm.

Figure 11:
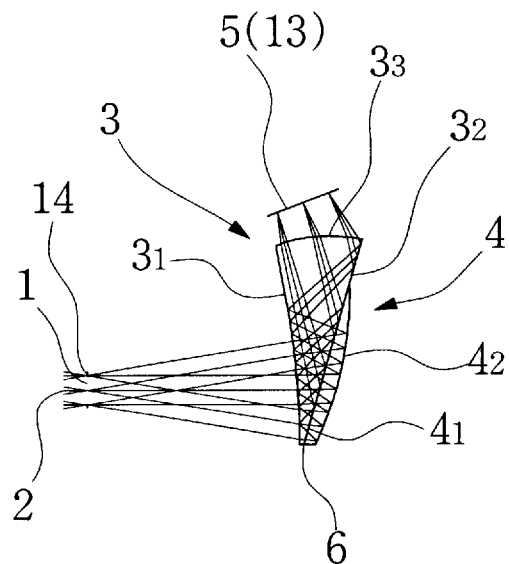
FIG. 11 is a view showing the Y-Z section containing the optical axis of an optical system according to a second embodiment in the present invention.

The Y-Z sectional views containing the optical axes of the observing optical systems according to the first and second embodiments of the present invention are shown in FIGS. 8 and 11, respectively. Each of the observing optical systems of the first and second embodiments is interposed between the image plane and the pupil plane. The LCD 5 is placed as the image display element for displaying an image observed by an observer on the image plane side. The optical system has the first prism 3, the second 5 prism 4, and the volume hologram (HOE) 6, as the holographic element, sandwiched between the first prism 3 and the second prism 4 and cemented to these prisms so that the exit pupil 1 is formed at the pupil plane in order to observe an observation image displayed on the LCD 5.

In the description of each embodiment, in principle, the surface number of the optical system is represented to the order in which a ray is traced from the exit pupil 1 to the LCD 5 (reverse ray tracing), and the order of the surfaces of the first and second prisms is also represented to the reverse ray tracing. A light beam traveling on the optical path connecting the exit pupil 1 and the LCD 5 through the optical system is called the first beam.

The first prism 3 has a 1-1 surface $3_1$, a 1-2 surface $3_2$, and a 1-3 surface $3_3$. The 1-1 surface $3_1$ is placed on the pupil side and is constructed as the totally reflecting surface such that the first beam, when entering this surface at an angle over the totally reflecting critical angle, is totally reflected and when entering the surface at an angle smaller than the totally reflecting critical angle, is transmitted. Furthermore, the 1-1 surface $3_1$ is constructed as a second exit surface and a second reflecting surface, combining the functions of transmitting and reflecting the first beam.

The 1-2 surface $3_2$ is located on the opposite side of the pupil with respect to the 1-1 surface $3_1$ and is joined to the second prism 4 through the volume hologram 6. The volume hologram 6 is bonded onto the 1-2 surface $3_2$ and is constructed to diffract and reflect the first beam when being incident at a first incident angle thereon and to transmit it when being incident at a second or third incident angle. The 1-2 surface $3_2$ is configured as a first reflecting surface, a first exit surface, and a second entrance surface, combining the functions of transmitting and reflecting the first beam. The 1-3 surface $3_3$ is located on the image plane side and is configured as a first entrance surface that has the function of transmitting the first beam.

The second prism 4 has a 2-1 surface $4_1$ and a 2-2 surface $4_2$. The 2-1 surface $4_1$, is located at a position opposite to the 1-2 surface $3_2$ of the first prism 3 and is joined to the 1-2 surface $3_2$ of the first prism 3 through the volume hologram 6. The volume hologram 6 bonded to the 1-2 surface $3_2$ of the first prism 3 is also bonded onto the 2-1 surface $4_1$, and is constructed to transmit the first beam when being incident at the second or third incident angle thereon. The 2-1 surface $4_1$ is configured as the entrance surface and the exit surface, having the function of transmitting the first beam at least twice. The 2-2 surface $4_2$ is placed on the opposite side of the pupil with respect to the 2-1 surface $4_1$ and is configured as a reflecting surface having the function of reflecting the first beam. The 1-2 surface $3_2$ of the first prism and the 2-1 surface $4_1$ of the second prism are configured to have the same shape.

The volume hologram 6, as mentioned above, is constructed so that when the first beam is incident at the first incident angle, it is diffracted and reflected and when the first beam is incident at the second or third incident angle, it is transmitted. Whereby, the 1-2 surface $3_2$ of the first prism combines the functions of reflecting and transmitting the first beam, and the 2-1 surface $4_1$ of the second prism has the function of transmitting the first beam at least twice.

In the observing optical system of each embodiment, the first beam emanating from the LCD 5, after being transmitted through the 1-3 surface $3_3$ and entering the first prism 3, is incident at the first incident angle on the volume hologram 6 bonded to the 1-2 surface $3_2$ and is diffracted and reflected by the volume hologram 6. The beam is then incident at an angle over the totally reflecting critical angle on the 1-1 surface $3_1$ and is totally reflected by the 1-1 surface $3_1$. Subsequently, the first beam is incident at the second incident angle on the volume hologram 6 bonded to the 1-2 surface $3_2$ and is transmitted through the volume hologram 6 to once emerge from the first prism 3. After that, the first beam is transmitted through the 2-1 surface $4_1$ of the second prism 4 to enter the second prism 4 and is reflected by the 2-2 surface $4_2$. The beam is incident at the third incident angle on the volume hologram 6 bonded to the 2-1 surface $4_1$ and is transmitted through the volume hologram 6 to thereby emerge from the second prism 4. The first beam is then transmitted through the 1-2 surface $3_2$ of the first prism 3 to enter the first prism 3 and is incident at an angle smaller than the totally reflecting critical angle on the 1-1 surface $3_1$. Finally, the beam is transmitted through the 1-1 surface $3_1$ and thereby emerges from the first prism and is introduced into the exit pupil 1.

In each embodiment of the present invention, the observing optical system is described, but when the image sensor 13 is replaced, instead of the LCD 5, at the image plane of the observing optical system and the aperture stop 14 for adjusting the brightness of a light beam from the object is place at the pupil plane (the position of the exit pupil 1), the optical system can be constructed as the imaging optical system.

In this case, light from the object passing through the aperture stop 14 is incident at an angle smaller than the totally reflecting critical angle on the 1-1 surface $3_1$ of the first prism 3, and after being transmitted through the 1-1 surface $3_1$ and entering the first prism, is incident at the third incident angle on the volume hologram 6 bonded to the 1-2 surface $3_2$. The light is transmitted through the volume hologram 6 to once emerge from the first prism 3 and is transmitted through the 2-1 surface $4_1$, of the second prism 4 to enter the second prism 4. The light is then reflected by the 2-2 surface $4_2$ and after being incident at the second incident angle on the hologram bonded to the 2-1 surface $4_1$ is transmitted through the volume hologram 6 to thereby emerge from the second prism 4. Subsequently, the light is transmitted through the 1-2 surface $3_2$ of the first prism 3 to enter again the first prism, and is incident at an angle over the totally reflecting critical angle on the 1-1 surface $3_1$ and totally reflected by the 1-1 surface $3_1$. The light is incident at the first incident angle on the volume hologram 8 bonded to the 1-2 surface $3_2$ and is diffracted and reflected by the volume hologram 6 to passing through the 1-3 surface $3_3$. In this way, the light leaves the first prism 3 and in introduced into the image sensor 13.

In each embodiment, the volume hologram is constructed by cementing three layers of R, G, and B so that a color image can be observed.

First Embodiment

In the optical system of the first embodiment, as shown in FIG. 8, the LCD-side surface (the 1-3 surface) $3_3$ of the first prism 3 is configured as a free curved surface; the surface (the 1-2 surface) $3_2$ to which the volume hologram 6 is bonded, as a planar surface; the pupil-side surface (the 1-1 surface) $3_1$, as the free curved surface; the surface (the 2-1 surface) $4_1$ of the second prism 4 to which the volume hologram 6 is bonded, as the planar surface; and the reflecting surface (the 2-2 surface) $4_2$, as the free curved surface.

Subsequently, numerical data of the first embodiment are shown. In these data, "FS" represents the free curved surface. The same holds for the second embodiment.

An aberration diagram representative of image distortion in the first embodiment is shown in FIG. 9. Aberration characteristics representative of transverse aberrations are shown in FIGS. 10A–10L. In FIG. 9, the abscissas are image heights in the X direction and the ordinates are image heights in the Y direction. FIG. 10A shows transverse aberration in the Y direction of the principal ray of the optical system where the field angle in the X direction is zero and the field angle in the Y direction is zero. FIG. 10B shows transverse aberration in the X direction of the principal ray of the optical system where the field angle in the X direction is zero and the field angle in the Y direction is zero. FIG. 10C shows transverse aberration in the Y direction of the principal ray of the optical system where the field angle in the X direction is zero and the field angle in the negative Y direction is maximized. FIG. 10D shows transverse aberration in the X direction of the principal ray of the optical system where the field angle in the X direction is zero and the field angle in the negative Y direction is maximized. FIG. 10E shows transverse aberration in the Y direction of the principal ray of the optical system where the field angle in the positive X direction is maximized and the field angle in the negative Y direction is maximized. FIG. 10F shows transverse aberration in the X direction of the principal ray of the optical system where the field angle in the positive X direction is maximized and the field angle in the negative Y direction is maximized. FIG. 10G shows transverse aberration in the Y direction of the principal ray of the optical system where the field angle in the positive X direction is maximized and the field angle in the Y direction is zero. FIG. 10H shows transverse aberration in the X direction of the principal ray of the optical system where the field angle in the positive X direction is maximized and the field angle in the Y direction is zero. FIG. 10I shows transverse aberration in the Y direction of the principal ray of the optical system where the field angle in the positive X direction is maximized and the field angle in the positive Y direction is maximized. FIG. 10J shows transverse aberration in the X direction of the principal ray of the optical system where the field angle in the positive X direction is maximized and the field angle in the positive Y direction is maximized. FIG. 10K shows transverse aberration in the Y direction of the principal ray of the optical system where the field angle in the X direction is zero and the field angle in the positive Y direction is maximized. FIG. 10L shows transverse aberration in the X direction of the principal ray of the optical system where the field angle in the X direction is zero and the field angle in the positive Y direction is maximized.

Numerical data 1

| Surface number | Radius of curvature | Surface-to-surface spacing | Decentering | Refractive index | Abbe's number |
|---|---|---|---|---|---|
| Object surface | $\infty$ | $-1000.00$ | | | |
| 1 | Pupil plane | 0.00 | | | |
| 2 | FFS [1] | 0.00 | Decentering (1) | 1.5254 | 56.2 |
| 3 | $\infty$ | 0.00 | Decentering (2) | 1.5254 | 56.2 |
| 4 | FFS [2] Reflecting surface | 0.00 | Decentering (3) | 1.5254 | 56.2 |
| 5 | $\infty$ | 0.00 | Decentering (2) | 1.5254 | 56.2 |
| 6 | FFS [1] Reflecting surface | 0.00 | Decentering (1) | 1.5254 | 56.2 |
| 7 | $\infty$ Reflecting surface | 0.00 | Decentering (4) | 1.5254 | 56.2 HOE [1] |
| 8 | FFS [3] | 0.00 | Decentering (5) | | |
| Image plane | $\infty$ | 0.00 | Decentering (6) | | |

FFS [1]

$C4 = -6.0104 \times 10^{-3}$, $C6 = 9.1100 \times 10^{-5}$, $C8 = -1.5842 \times 10^{-4}$,
$C10 = -1.7049 \times 10^{-4}$, $C11 = 6.3575 \times 10^{-7}$, $C13 = -6.0406 \times 10^{-6}$,
$C15 = -3.6632 \times 10^{-6}$

FFS [2]

$C4 = -1.2130 \times 10^{-2}$, $C6 = -9.9971 \times 10^{-3}$, $C8 = -7.4549 \times 10^{-5}$,
$C10 = -1.2694 \times 10^{-4}$, $C11 = -8.7389 \times 10^{-7}$, $C13 = -2.3953 \times 10^{-6}$,
$C15 = 3.7046 \times 10^{-6}$

FFS [3]

$C4 = 1.7111 \times 10^{-2}$, $C6 = 7.1662 \times 10^{-3}$, $C8 = 2.4123 \times 10^{-4}$,
$C10 = 1.9024 \times 10^{-4}$, $C11 = -3.9336 \times 10^{-6}$, $C13 = -5.7465 \times 10^{-5}$,
$C15 = 5.5849 \times 10^{-5}$

HOE [1]

| | | |
|---|---|---|
| HV 1 = REA | HV 2 = REA | HOR = 1 |
| HX 1 = 0.0 | HY 1 = 0.0 | HZ 1 = 0.0 |
| HX 2 = 0.0 | HY 2 = 0.0 | HZ 2 = 0.0 |
| HWL (the first layer) = 630 | HWL (the second layer) = 520 | WHL (the third layer) = 470 |

$H2 = 3.3746 \times 10^{-2}$, $H3 = -6.1798 \times 10^{-4}$, $H5 = -1.4637 \times 10^{-4}$,
$H7 = -1.2875 \times 10^{-5}$, $H9 = -8.8053 \times 10^{-6}$, $H10 = -2.8572 \times 10^{-7}$,
$H12 = -2.0469 \times 10^{-6}$, $H14 = 1.8705 \times 10^{-6}$, $H16 = 6.9658 \times 10^{-8}$,
$H18 = 1.6211 \times 10^{-7}$, $H20 = -1.5302 \times 10^{-7}$, $H21 = 1.7543 \times 10^{-8}$,
$H23 -1.1146 \times 10^{-8}$, $H25 = -3.6905 \times 10^{-9}$, $H27 = 3.4689 \times 10^{-9}$ Decentering [1]

| | | |
|---|---|---|
| X = 0.00 | Y = 0.00 | Z = 28.00 |
| α = 1.70 | β = 0.00 | γ = 0.00 |

Decentering [2]

| | | |
|---|---|---|
| X = 0.00 | Y = −0.14 | Z = 31.25 |
| α = −15.02 | β = 0.00 | γ = 0.00 | uz,24/31 Decentering [3]

| | | |
|---|---|---|
| X = 0.00 | Y = 2.92 | Z = 33.95 |
| α = −15.78 | β = 0.00 | γ = 0.00 |

Decentering [4]

| | | |
|---|---|---|
| X = 0.00 | Y = 0.00 | Z = 31.25 |
| α = −15.02 | β = 0.00 | γ = 0.00 |

Decentering [5]

| | | |
|---|---|---|
| X = 0.00 | Y = 19.02 | Z = 28.48 |
| α = −78.98 | β = 0.00 | γ = 0.00 |

Decentering [6]

| | | |
|---|---|---|
| X = 0.00 | Y = 24.18 | Z = 29.09 |
| α = −68.57 | β = 0.00 | γ = 0.00 |

Conditions:
Conditions (1), (2), and (3)    $|\theta| = 68.57°$

Second Embodiment

In the optical system of the second embodiment, as shown in FIG. 11, the LCD-side surface (the 1-3 surface) $3_3$ of the first prism 3 is configured as a free curved surface; the surface (the 1-2 surface) $3_2$ to which the volume hologram 6 is bonded, as a planar surface; the pupil-side surface (the 1-1 surface) $3_1$, as a rotational symmetrical aspherical surface; the surface (the 2-1 surface) $4_1$ of the second prism 4 to which the volume hologram 6 is bonded, as the planar surface; and the reflecting surface (the 2-2 surface) $4_2$, as the free curved surface.

Subsequently, numerical data of the second embodiment are shown blow.

Numerical Data 2

| Surface number | Radius of curvature | Surface-to-surface spacing | Decentering | Refractive index | Abbe's number |
|---|---|---|---|---|---|
| Object surface | ∞ | −1000.00 | | | |
| 1 | Pupil plane | 0.00 | | | |
| 2 | Aspherical surface [1] | 0.00 | Decentering (1) | 1.5254 | 56.2 |
| 3 | ∞ | 0.00 | Decentering (2) | 1.5254 | 56.2 |
| 4 | FFS [1] Reflecting surface | 0.00 | Decentering (3) | 1.5254 | 56.2 |
| 5 | ∞ | 0.00 | Decentering (2) | 1.5254 | 56.2 |
| 6 | Aspherical surface[1] Reflecting surface | 0.00 | Decentering (1) | 1.5254 | 56.2 |
| 7 | ∞ Reflecting surface | 0.00 | Decentering (4) | 1.5254 | 56.2 HOE [1] |
| 8 | FFS [2] | 0.00 | Decentering (5) | | |
| Image plane | ∞ | 0.00 | Decentering (6) | | |

Aspherical surface [1]

Radius of curvature = −120.00
$k = 4.8010 \times 10$
$a = 1.3924 \times 10^{-6}$, $b = 8.1209 \times 10^{-9}$, $c = -5.1194 \times 10^{-11}$,
$d = 2.4164 \times 10^{-13}$

FFS [1]

$C_4 = -1.0261 \times 10^{-2}$, $C_6 = -1.0540 \times 10^{-2}$, $C_8 = 3.1870 \times 10^{-6}$,
$C_{10} = 9.0440 \times 10^{-6}$, $C_{11} = -1.5109 \times 10^{-6}$, $C_{13} = -5.4488 \times 10^{-6}$,
$C_{15} = -1.9481 \times 10^{-6}$

FFS [2]

$C_4 = 1.8624 \times 10^{-2}$, $C_6 = 2.5059 \times 10^{-2}$, $C_8 = -4.1232 \times 10^{-4}$,
$C_{10} = -9.9236 \times 10^{-4}$, $C_{11} = -8.6285 \times 10^{-6}$, $C_{13} = -2.3343 \times 10^{-5}$,
$C_{15} = 7.2175 \times 10^{-5}$

HOE [1]

HV 1 = REA  HV 2 = REA  HOR = 1
HX 1 = 0.0  HY 1 = 0.0  HZ 1 = 0.0
HX 2 = 0.0  HY 2 = 0.0  HZ 2 = 0.0
HWL (the first layer) = 630  HWL (the second layer) = 520  WHL (the third layer) = 470
$H_2 = 4.1079 \times 10^{-3}$, $H_3 = -4.1970 \times 10^{-4}$, $H_5 = -2.8031 \times 10^{-4}$,
$H_7 = -1.9337 \times 10^{-5}$, $H_9 = -1.4384 \times 10^{-5}$, $H_{10} = -4.5594 \times 10^{-7}$,
$H_{12} = -2.6280 \times 10^{-6}$, $H_{14} = 3.3787 \times 10^{-6}$, $H_{16} = 2.9880 \times 10^{-8}$,
$H_{18} = 5.5989 \times 10^{-7}$, $H_{20} = -2.1433 \times 10^{-7}$, $H_{21} = -3.1723 \times 10^{-8}$,
$H_{23} = -4.0539 \times 10^{-8}$, $H_{25} = -1.7457 \times 10^{-8}$, $H_{27} = 4.1484 \times 10^{-9}$ Decentering [1]

X = 0.00  Y = −1.81  Z = 28.00
α = 3.12  β = 0.00  γ = 0.00

Decentering [2]

X = 0.00  Y = 0.00  Z = 30.80
α = −15.55  β = 0.00  γ = 0.00

Decentering [3]

X = 0.00  Y = 1.26  Z = 33.34
α = −14.09  β = 0.00  γ = 0.00

Decentering [4]

X = 0.00  Y = 0.00  Z = 30.80
α = −15.55  β = 0.00  γ = 0.00

Decentering [5]

X = 0.00  Y = 20.30  Z = 28.99
α = −82.53  β = 0.00  γ = 0.00

Decentering [6]

X = 0.00  Y = 24.98  Z = 28.56
α = −69.03  β = 0.00  γ = 0.00
Conditions:
Conditions (1), (2), and (3)  |θ| = 69.03°

Third Embodiment

Figure 12:
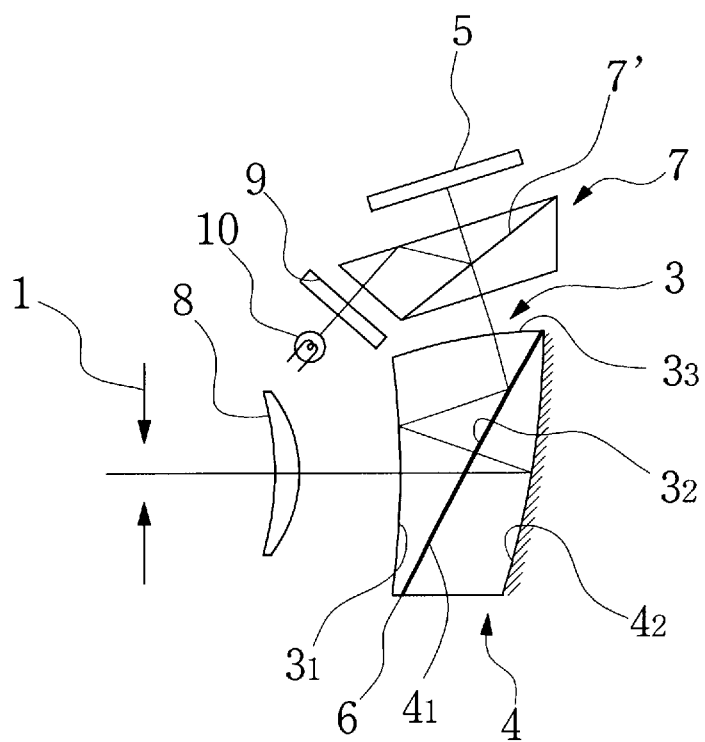
FIG. 12 is a view showing the Y-Z section containing the optical axis of an optical system according to a third embodiment in the present invention.

FIG. 12 shows the Y-Z section containing the optical axis of the observing optical system according to the third embodiment in the present invention.

The optical system of this embodiment is constructed by adding optical members, such as a polarization beam splitter 7 and a positive lens 8, to the optical system of the first or second embodiment.

The polarization beam splitter 7 is interposed between the 1-3 surface $3_3$ of the first prism 3 and the LCD 5. On the side of the polarization beam splitter 7, a polarizing plate 9 and a light source for illumination (LED) 10 are provided.

Illumination light emitted from the LED 10 is converted into linearly polarized component light through the polarizing plate 9 and is incident on the polarization beam splitter 7. A predetermined amount of linearly polarized component light is reflected by a polarizing surface 7' of the polarization beam splitter 7 and emerges from the LCD-side surface thereof to irradiate the LCD 5. After that, the light is reflected by the LCD 5, and thereby the linearly polarized component is polarized and enters the polarization beam splitter 7. The light is transmitted through the polarizing splitter 7' and emerges from the polarization beam splitter 7, thereby entering the 1-3 surface $3_3$ of the first prism 3. In the third embodiment, the LCD-side surface (the 1-3 surface) $3_3$ of the first prism 3 is configured as a free curved surface; the surface (the 1-2 surface) $3_2$ to which the volume hologram 6 is bonded, as a planar surface; the pupil-side surface (the 1-1 surface) $3_1$, as a free curved surface or a rotational symmetrical aspherical surface; the surface (the 2-1 surface) $4_1$ of the second prism 4 to which the volume hologram 6 is bonded, as the planar surface; and the reflecting surface (the 2-2 surface) $4_2$, as the free curved surface. A mirror coating is applied to the reflecting surface (the 2-2 surface) $4_2$.

The positive lens is interposed between the 1-1 surface $3_1$ of the first prism 3 and the exit pupil 1 so that an image of light emerging from the 1-1 surface $3_1$ of the first prism 3 is corrected for aberration and is formed at the exit pupil 1.

Fourth Embodiment

Figure 13:
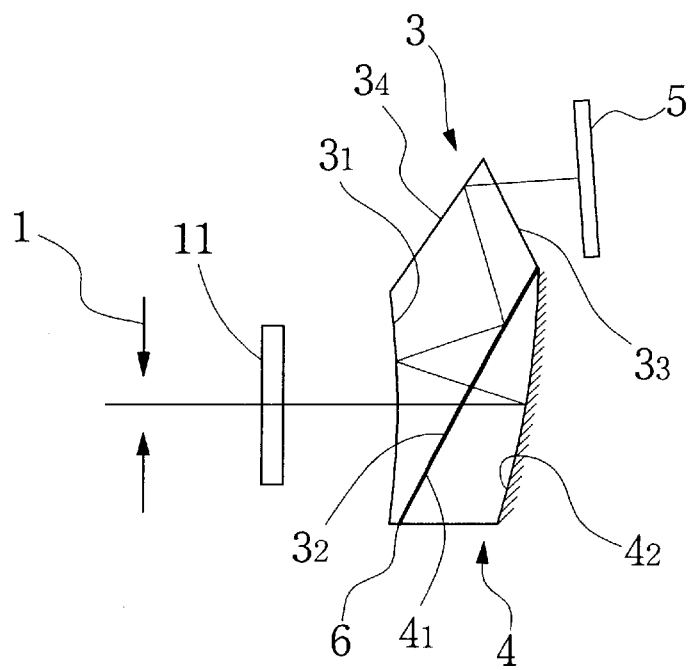
FIG. 13 is a view showing the Y-Z section containing the optical axis of an optical system according to a fourth embodiment in the present invention.

FIG. 13 shows the Y-Z section containing the optical axis of the observing optical system according to the fourth embodiment in the present invention.

In the optical system of this embodiment, the first prism 3 has a surface $3_4$ for reflecting the first beam traveling through the prism in the optical path between the 1-3 surface $3_3$ and the 1-2 surface $3_2$ A cover member 11 made of glass, such as a plane-parallel plate, is placed between the 1-1 surface $3_1$ of the first prism 3 and the exit pupil 1.

In the fourth embodiment, the LCD-side surface (the 1-3 surface) $3_3$ of the first prism 3 is configured as a free curved surface; the surface (the 1-2 surface) $3_2$ to which the volume hologram 6 is bonded, as a planar surface; the pupil-side surface (the 1-1 surface) $3_1$, as a free curved surface or a rotational symmetrical aspherical surface; the surface $3_4$ for reflecting the first beam traveling through the prism in the optical path between the 1-3 surface $3_3$ and the 1-2 surface $3_2$, as the free curved surface; the surface (the 2-1 surface) $4_1$ of the second prism 4 to which the volume hologram 6 is bonded, as the planar surface; and the reflecting surface (the 2-2 surface) $4_2$, as the free curved surface. A mirror coating is applied to the reflecting surface (the 2-2 surface) $4_2$.

Fifth Embodiment

Figure 14:
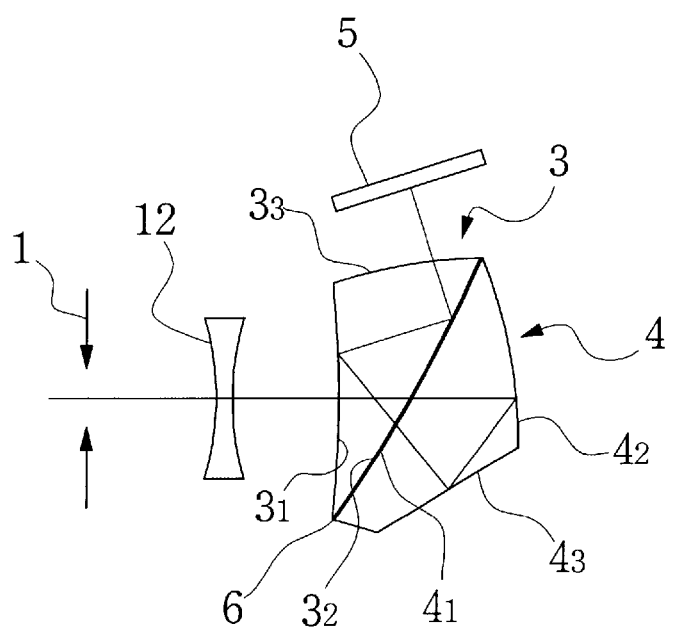
FIG. 14 is a view showing the Y-Z section containing the optical axis of an optical system according to a fifth embodiment in the present invention.

FIG. 14 shows the Y-Z section containing the optical axis of the observing optical system according to the fifth embodiment in the present invention.

In the optical system of this embodiment, the second prism 4 has a surface $4_3$ for reflecting the first beam traveling through the prism in the optical path between the 2-2 surface $4_2$ and the 2-1 surface $4_1$.

In the fifth embodiment, the LCD-side surface (the 1-3 surface) $3_3$ of the first prism 3 is configured as a free curved surface; the surface (the 1-2 surface) $3_2$ to which the volume hologram 6 is bonded, as a planar surface; the pupil-side surface (the 1-1 surface) $3_1$, as a free curved surface or a rotational symmetrical aspherical surface; the surface (the 2-1 surface) $4_1$ of the second prism 4 to which the volume hologram 6 is bonded, as the planar surface; the reflecting surface (the 2-2 surface) $4_2$, as the free curved surface; and the surface $4_3$ for reflecting the first beam traveling through the prism in the optical path between the 2-2 surface $4_2$ and the 2-1 surface $4_1$, as the free curved surface.

A negative lens 12 is placed between the 1-1 surface $3_1$ of the first prism 3 and the exit pupil 1.

Sixth Embodiment

Figure 15:
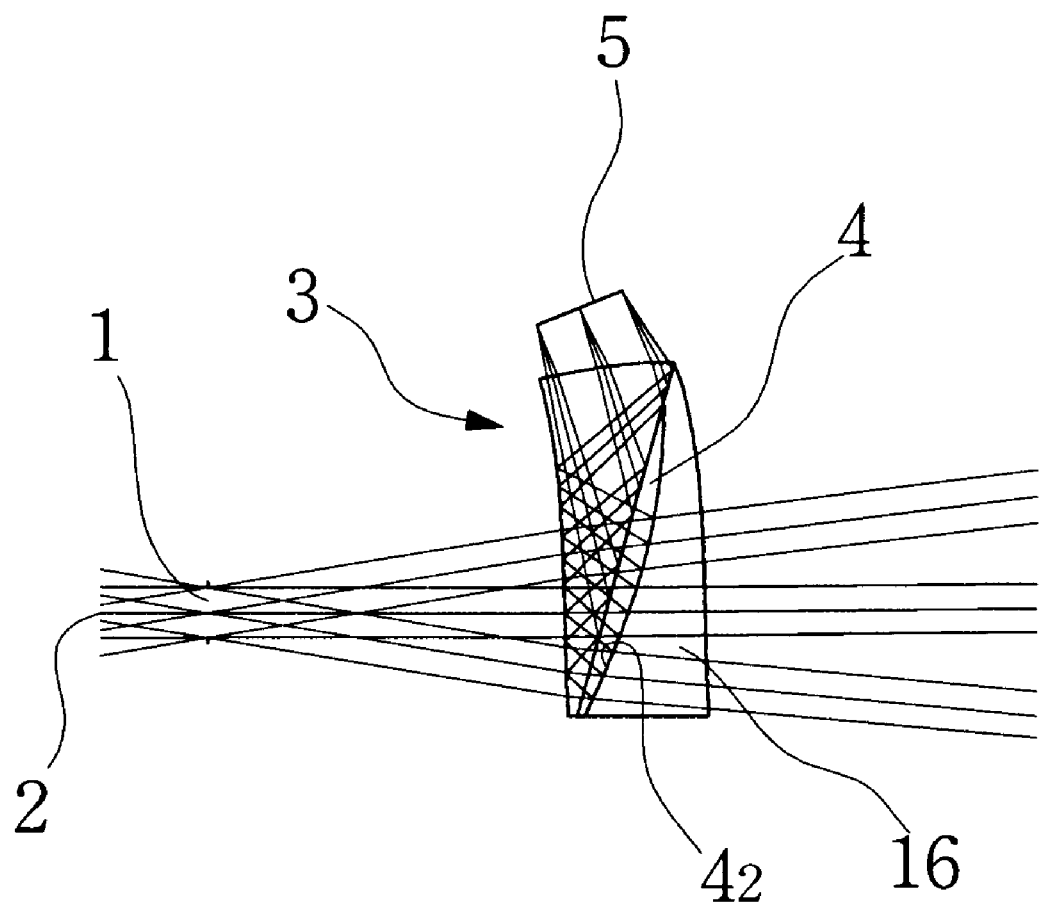
FIG. 15 is a view showing the Y-Z section containing the optical axis of an optical system according to a sixth embodiment in the present invention.

FIG. 15 shows the Y-Z section containing the optical axis of the observing optical system according to the sixth embodiment in the present invention.

The observing optical system of this embodiment is such that when a light beam traveling from the pupil plane through the first prism 3 toward the second prism 4 is taken as a second beam, the 2-2 surface $4_2$ of the second prism 4 is configured as a totally reflecting surface that reflects the second beam where the second beam is incident at an angle over the totally reflecting critical angle thereon and transmits the beam where it is incident at an angle smaller than the totally reflecting critical angle. A prism 16 is provided on the side of the 2-2 surface $4_2$ so that an external image can be viewed by a transmission observation, in addition to an observation image obtained by the LCD 5.

Also, the 2-2 surface $4_2$ of the second prism 4, instead of being configured as the totally reflecting surface mentioned above, may be configured as a half mirror surface.

Seventh Embodiment

Figure 16:
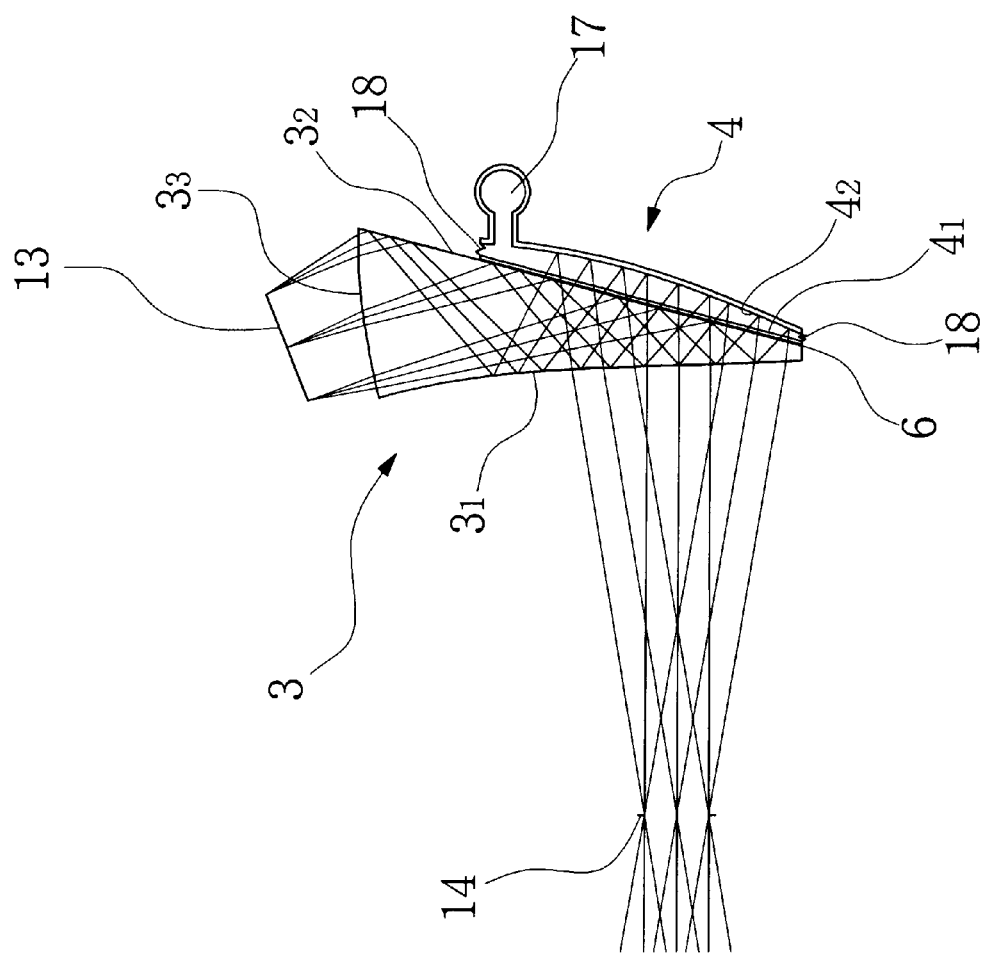
FIG. 16 is a view showing the Y-Z section containing the optical axis of an optical system according to a seventh embodiment in the present invention.

FIG. 16 shows the Y-Z section containing the optical axis of the observing optical system according to the seventh embodiment in the present invention.

The imaging optical system of this embodiment is such that, in each of the first to sixth embodiments, the LCD 5 and the exit pupil 1 are replaced by the image sensor 13 and the aperture stop 14, respectively, and the second prism 4 uses a medium as a liquid and has the reflecting surface (the 2-2 surface) $4_2$ configured as a deformable mirror surface (refer to: Gleb Vdovin, "Quick focusing of imaging optics using micromachined adaptive mirrors", Optics Communications, 140, 187–190, 1997).

Specifically, the second prism 4 is configured of plastic to be transparent and hollow and is charged with a liquid therein, having a buffer section 17 provided with a liquid buffer. Moreover, the second prism 4 is provided with a bellows section 18 configured to be deformable like bellows on the side of the deformable mirror surface $4_2$ so that the bellows section 18 is expanded or collapsed in accordance with the pressure of the liquid with which the buffer is charged.

According to the seventh embodiment, the buffer section 17 is pressed to apply a hydraulic pressure to the second prism 4, and thereby the bellows section 18 is expanded to shift the position of the deformable mirror surface $4_2$. When the position of the deformable mirror surface $4_2$ is shifted, the optical length of a light beam which is reflected by this surface and directed toward the image sensor 13 is changed and the imaging position is also changed.

According to the seventh embodiment, therefore, the second prism 4 can be used as the focusing mechanism of the imaging optical system.

The observing optical system and the imaging optical system according to the present invention, mentioned above, can be used as an observing apparatus for observing an object image through an eyepiece and a photographing apparatus for photographing by forming an object image and receiving the image by an image sensor, such as a CCD, or a halide film. Specifically, these apparatuses are microscopes, head mounted image displays, endoscopes, projectors, halide-film cameras, digital cameras, VTR cameras, etc. The following are examples of these apparatuses.

Figure 17:
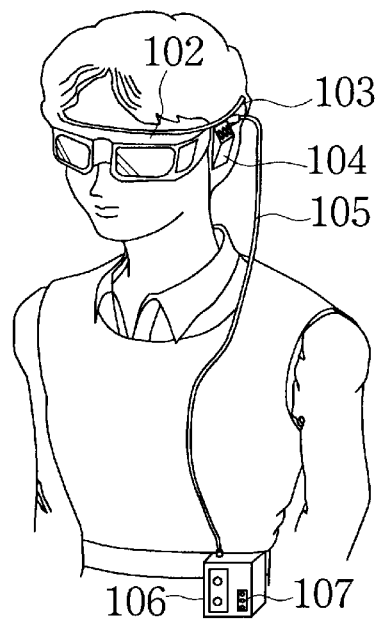
FIG. 17 is a view showing a head mounted image display for eyes using the observing optical system of the present invention, mounted on an observer's head.
Figure 18:
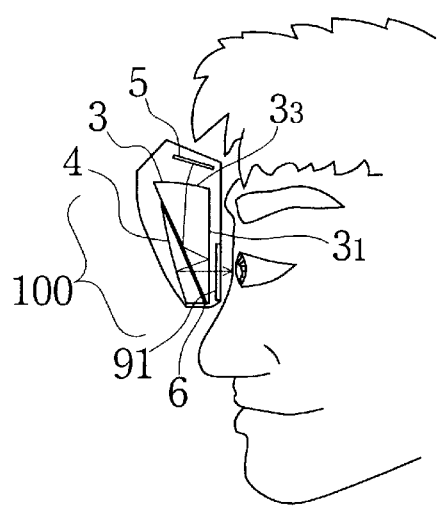
FIG. 18 is a sectional view of FIG. 17.

A head mounted image display mounted on an observer's head is shown in FIGS. 17 and 18. In this construction, the observing optical system according to the present invention, as shown in FIG. 18, is used as an ocular system 100 provided with the image display element 5. A pair of ocular optical systems 100 for the eyes are provided and separated in accordance with the interpupillary distance of an observer, and thereby they are constructed as a potable type image display 102 like an installed or head mounted image display in which an image can be observed with the eyes.

That is, the observing optical systems mentioned above are uses as the ocular optical systems 100 in the image display 102, in which a pair of ocular optical systems 100 for the eyes are provided and the image display elements 5 composed of liquid crystal display elements are arranged at image planes, corresponding to these optical systems. In the image display 102, as shown in FIG. 17, a temple frame 103 extending continuously to the left and right of the observer' head is provided so that the image display 102 can be supported in front of the eyes of the observer. As shown in FIG. 18, a cover member 91 is interposed between the exit pupil of the ocular optical system 100 and the 1-1 surface $3_1$. A plane-parallel plate, a positive lens, or a negative lens may be used as the cover member 91.

A speaker 104 is attached to the temple frame 103 so that an image observation and a stereophonic sound can be achieved at the same time. A video reproducing device 106, such as a portable video cassette, is connected through an image and sound transmitting cable 105 to the image display 102 with the speaker 104, so that the observer is capable of holding the video reproducing device 106 at any position of his belt to enjoy the image and sound. In FIG. 17, reference numeral 107 is a switch and volume control section for the video reproducing device 106. Also, electric parts, such as image and sound processing circuits, are housed in the image display 102.

The cable 105 may be designed so that its tip as a jack can be attached to the existing video deck. Further, it may be connected to a tuner for TV electric wave reception to watch the TV, or may be connected to a computer so as to receive the image of computer graphics or the message image from the computer. To remove the cable which is obstructive to the operation, an antenna may be provided to receive a signal from the outside through the electric wave.

Figure 19:
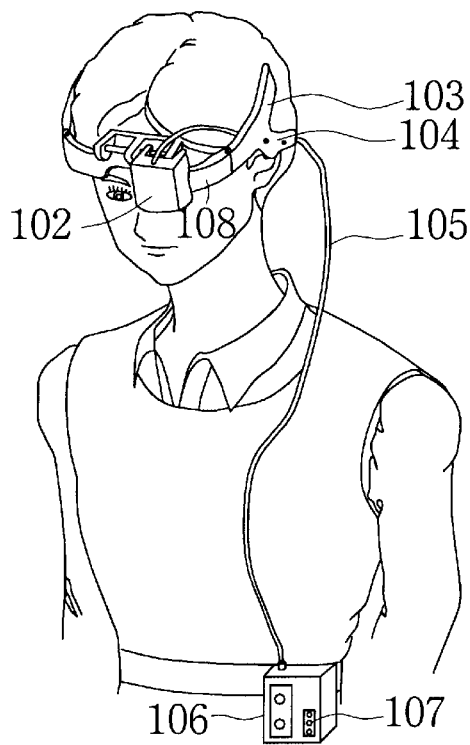
FIG. 19 is a view showing a head mounted image display for one eye using the observing optical system of the present invention, mounted on an observer's head.

Furthermore, the observing optical system according to the present invention may be used in a head mounted image display for one eye in which the ocular optical system is placed in front of one of the eyes. FIG. 19 shows this image display for one eye (the left eye in this case) mounted on the observer's head. In this construction, the image display 102 having the ocular optical system 100 with the image display element 5 is mounted in front of the eye corresponding to a front frame 108, which is provided with the temple frame 103 extending continuously to the left and right of the head, so that the image display 102 can be held in front of the one eye of the observer. Since other constructions are the same as in FIG. 17, their explanation is omitted.

Figure 20:
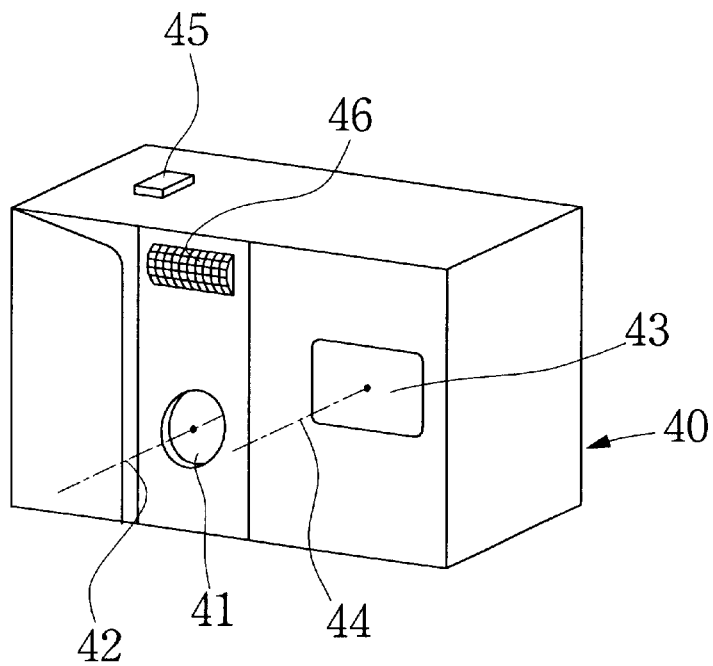
FIG. 20 is a front perspective view showing the appearance of an electronic camera applying the imaging optical system and the observing optical system of the present invention.
Figure 21:
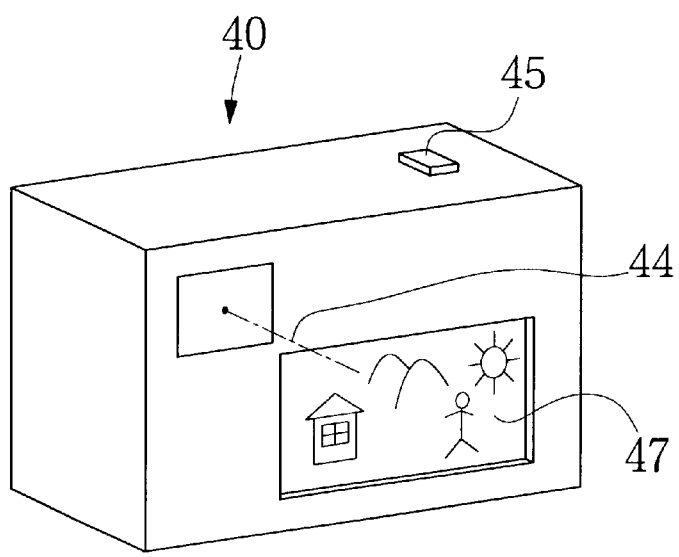
FIG. 21 is a rear perspective view of the electric camera in FIG. 20.
Figure 22:
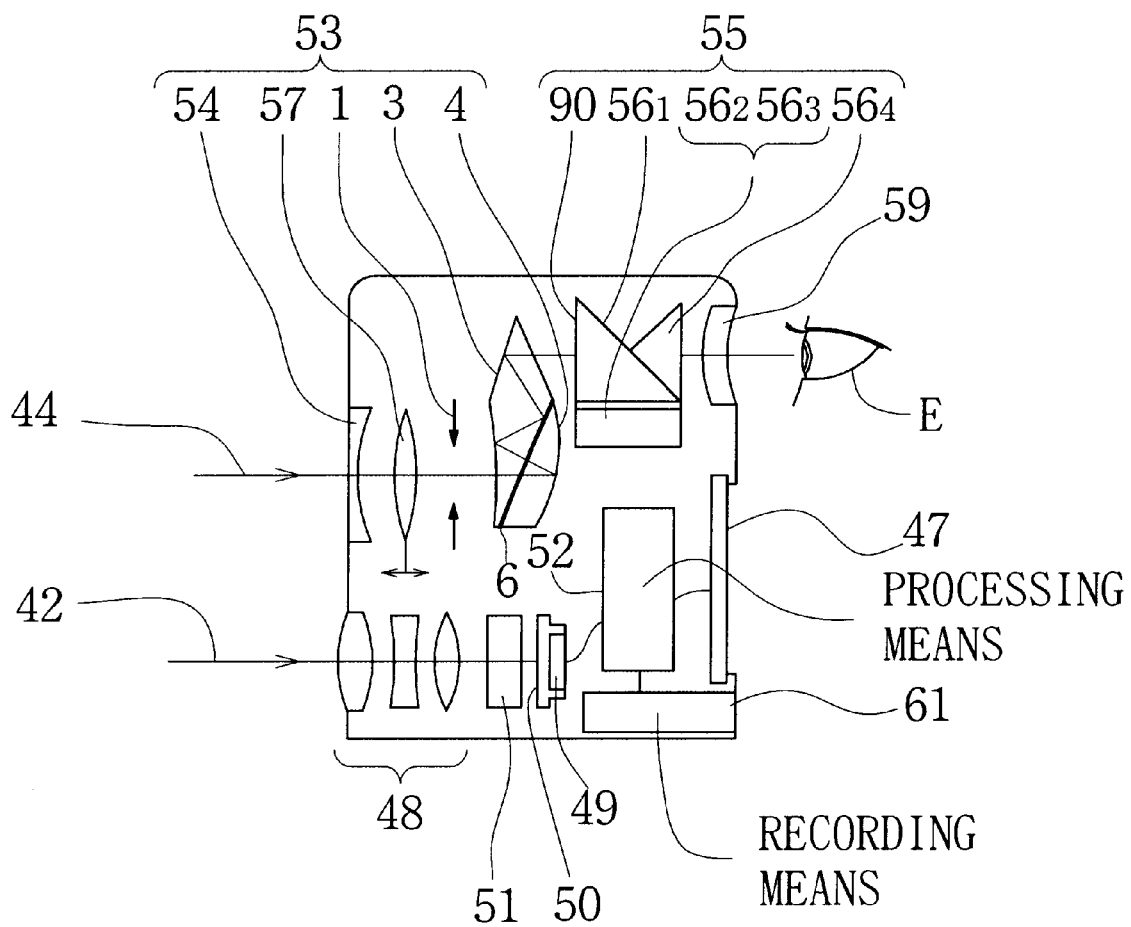
FIG. 22 is a sectional view showing one example of the construction of the electronic camera in FIG. 20.

FIGS. 20 and 21 show the appearance of an electronic camera in which essential parts of the imaging optical system of the present invention are incorporated in the objective optical system of the finder section thereof. FIG. 22 shows the construction of the electronic camera.

An electronic camera 40 includes a photographing optical system 41 having a photographing optical path 42, a finder optical system 43 having a finder optical path 44, shutter button 45, a flash lamp 46, and a liquid crystal display monitor 47. When the shutter button 45 provided on the upper portion of the camera 40 is pushed, photographing is performed in association with the operation of the shutter button 45 through a photographing objective optical system 48. An object image formed by the photographing objective optical system 48 is transmitted on an image pickup surface 50 of a CCD 49 through a filter 51 such as a low-pass filer or an infrared cutoff filter.

The object image received by the CCD 49 is displayed, as an electronic image, through a processing means 52 on the liquid crystal display monitor 47 provided on the back of the camera. The processing means 52 is provided with a recording element 61 so that a photographed electronic image can also be recorded. The recording element 61 may be provided to be independent of the processing means 52 or may be constructed so that image information is electronically recorded and written by a floppy disk, for instance. Moreover, instead of the CCD 49, a camera with a halide film may be provided.

On the finder optical path 44, a finder objective optical system 53 is provided, and includes a cover lens 54, a positive lens unit 57 which is capable of shifting its position along the optical axis for focusing, and the aperture stop 1, the first prism 3, and the second prism 4 which are shown in FIG. 13. The cover lens 54 used as a cover member is a lens unit with a negative power and serves to increase the field angle. The object image formed on an imaging surface 90 of the finder objective optical system 53 is transmitted on the field frame of a Porro prism 55 which is an image erecting member.

The field frame separates a first reflecting surface $56_1$ from a second reflecting surface $56_2$ of the Porro prism 55 and is interposed between them. The Porro prism 55 includes the first reflecting surface $56_1$, the second reflecting surface $56_2$, a third reflecting surface $56_3$, and a fourth reflecting surface $56_4$. Behind the Porro prism 55, an ocular optical system 59 is placed to introduce an erect image into an observer's eye E.

In the camera 40 constructed as mentioned above, the finder objective optical system 53 can be constructed with a small number of optical members and high performance and low cost can be achieved. Furthermore, the objective optical system 53 can be constructed in such a way that its optical path is bent, and thus the number of degrees of layout inside the camera is increased, which is advantageous for design.

Also, although no reference is made to the construction of the photographing objective optical system 48 in FIG. 22, it is, of course, possible to use any type of imaging optical system composed of the two prisms 3 and 4 of the present invention, as well as a refraction type coaxial optical system, as the photographing objective optical system 48.

Figure 23:
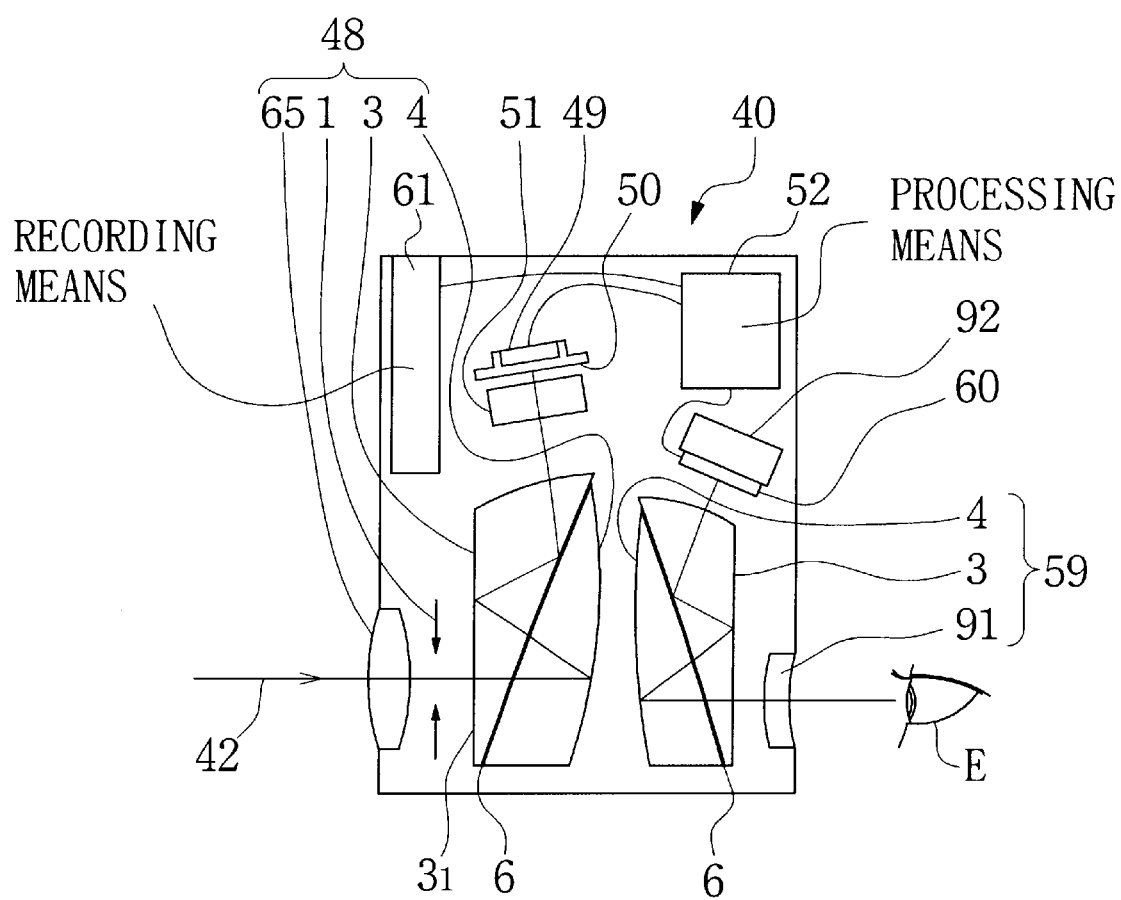
FIG. 23 is a conceptual view showing another electronic camera applying the imaging optical system and the observing optical system of the present invention.

FIG. 23 shows the construction of the electronic camera 40 where the imaging optical system of the present invention is incorporated in the photographing objective optical system 48 and the observing optical system of the present invention is incorporated in the ocular optical system 59. In this case, the photographing objective optical system 48 placed on the photographing optical path 42 includes a cover member 65 of a positive lens and the imaging optical system comprised of the two prisms 3 and 4 such as those shown in either the first or second embodiments of the present invention. The filter 51, such as a low-pass filter or an infrared cutoff filter, is interposed between the first prism 3 and the CCD 49, and the object image formed by the photographing objective optical system 48 is transmitted onto the image pickup surface 50 of the CCD 49. The object image received by the CCD 49 is displayed, as an electronic image, through the processing means 52 on a liquid crystal display element (LCD) 60. The processing means 52 also controls the recording means 61 for recording the object image picked up by the CCD 49 as electronic information. An image displayed on the LCD 60 is introduced into the observer's eye E through the ocular optical system 59.

The ocular optical system 59 in FIG. 23 includes the decentering optical systems 3 and 4 that have the same configurations as in the observing optical system shown in the first or second embodiment of the present invention and a cover lens 91 disposed on the exit pupil side thereof. Moreover, a backlight 92 for illuminating the LCD 60 is placed on the back of the LCD 60. Also, the photographing objective optical system 48 may have another lens (a positive or negative lens) as its constituent element on the object or image side of the two prisms 3 and 4.

In the camera 40 constructed as mentioned above, each of the photographing objective optical system 48 and the ocular optical system 59 can be constructed with a small number of optical members and high performance and low cost can be achieved. Furthermore, the entire optical system is arranged on the same plane, and thus a thickness in a direction normal to this plane can be reduced.

Also, although in this example the positive lens is disposed as the cover member 65 of the photographing objective optical system 48, a negative lens or a plane-parallel plate may be used.

Here, without providing the cover member, the most object-side surface of the imaging optical system of the present invention can also be used as the cover member. In this example, the most object-side surface corresponds to the entrance surface $3_1$ of the first prism 1. However, the entrance surface $3_1$ is decentered with respect to the optical axis, and hence when this surface is placed in front of the camera, an observer has an illusion that the center of the photographic field of the camera 40 is shifted, viewed from the object side (In general, the observer feels that photographing is performed in a direction normal to the entrance surface as in an ordinary camera). Consequently, the observer has a feeling of discomfort. Thus, when the most object-side surface of the imaging optical system is decentered as in the present invention, it is desirable to provide the cover member 65 (or the cover lens 54) because the observer has no feeling of discomfort and is capable of photographing with the same feeling as in a conventional camera.

Since the prism 3 is provided with the holographic element, it is desirable to provide the cover member 65 and the cover lens 91 even in order to prevent a change of the peak wavelength of diffraction caused by water penetration.

Figure 24A:
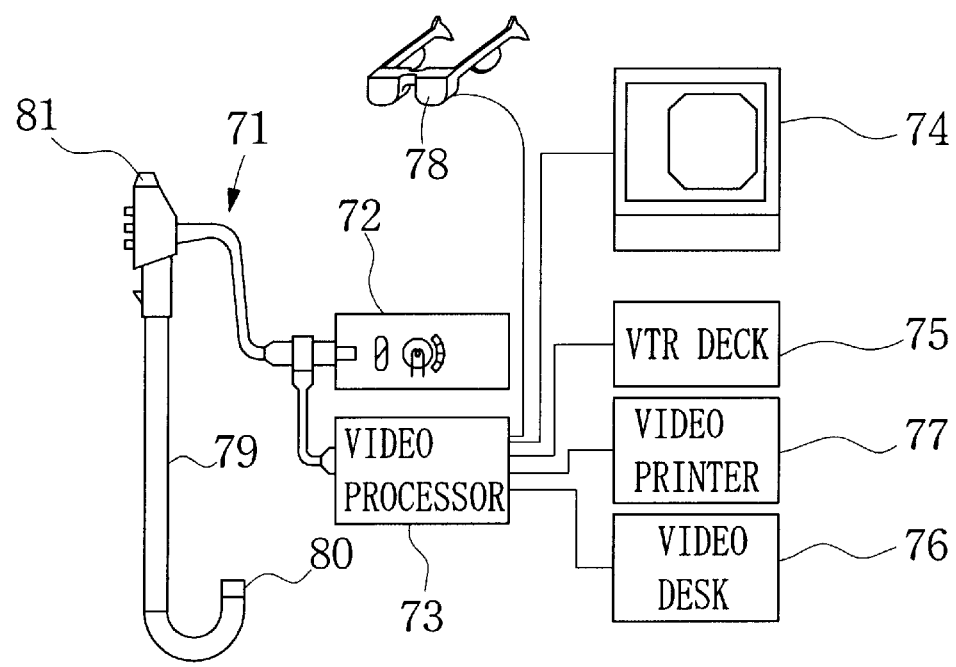
FIGS. 24a and 24B are conceptual views showing an endoscope applying the imaging optical system and the observing optical system of the present invention.
Figure 24B:
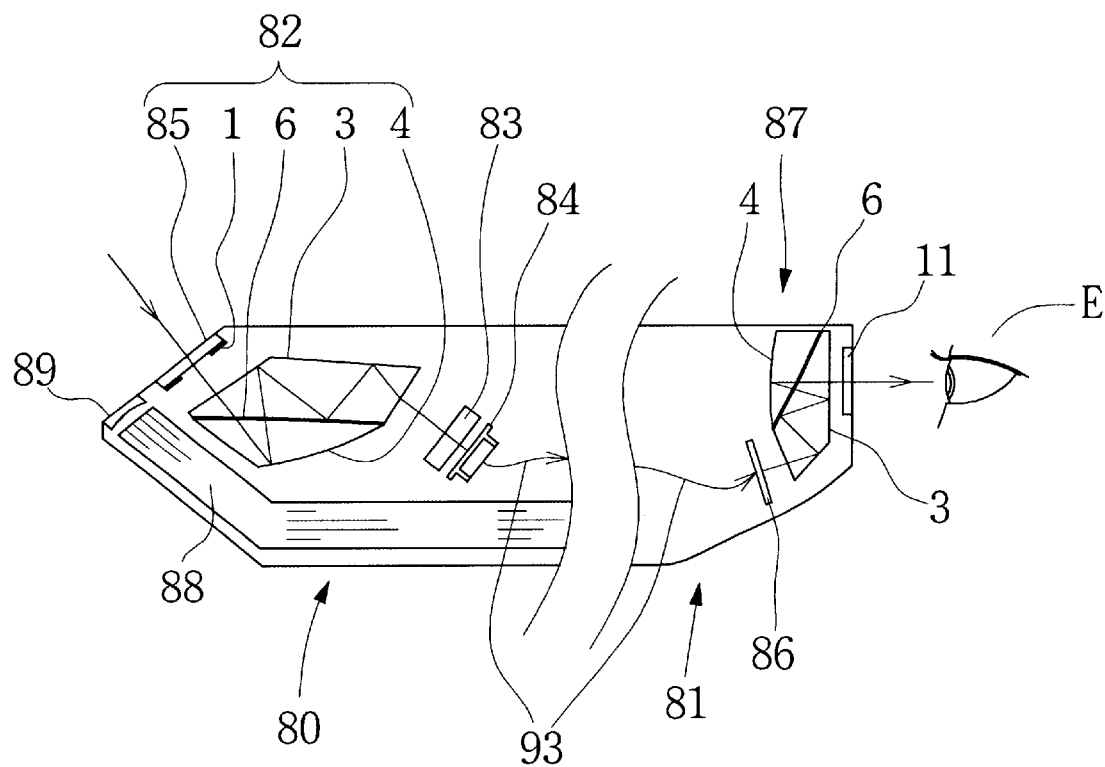

FIGS. 24A and 24B show the construction of an electronic endoscope where the imaging optical system of the present invention is incorporated in an objective optical system 82 of the observation system of the electronic endoscope and the observing optical system of the present invention is incorporated in an ocular optical system 87 of the observation system of the electronic endoscope. In this case, the objective optical system 82 and the ocular optical system 87 of the observation system use the optical systems of almost the same configurations as in the first and second embodiments. This electronic endoscope, as shown in FIG. 24A, includes an electronic endoscope 71, a light source device 72 for supplying illumination light, a video processor 73 for processing a signal from the electronic endoscope 71, a monitor 74 for displaying an image signal outputted from the video processor 73, a VTR deck 75 and a video desk 76 which are connected to the video processor 73 to record an image signal, a video printer 77 for printing out the image signal as an image, and a head mounted image display (HMD) 78 such as that shown in FIG. 17. A distal end 80 of an inserting portion 79 of the electronic endoscope 71 and an eyepiece section 81 thereof are constructed as illustrated in FIG. 24B.

A light beam emitted from the light source device 72 illuminates a part to be observed by passing through an illumination objective optical system 89 through a light guide fiber bundle 88. Light from the part forms an object image by passing through the observing objective optical system 82 through a cover member 85. The object image is formed on the image pickup surface of a CCD 84 through a filter 83 such as a low-pass filter or an infrared cutoff filter. Moreover, the object image is converted by the CCD 84 into an image signal, which is displayed directly on the monitor 74 by the video processor 73 shown in FIG. 24A and after being recorded in the VTR deck 75 and the video desk 76, is printed out as an image by the video printer 77. The image is displayed on the image display element 5 (FIG. 18) of the HMD 78 so that the wearer of the HMD 78 can view the image. At the same time, the image signal converted by the CCD 84 is displayed as an electronic image on a liquid crystal display element (LCD) 86 of the eyepiece section 81 through an image signal transmitting means 93. A displayed image is introduced into the observer's eye E through the ocular optical system 87 constituting the observing optical system of the present invention.

In the endoscope constructed as mentioned above, the optical system can be constructed with a small number of optical members and high performance and low cost can be achieved. Furthermore, the objective optical system 82 is placed along the longitudinal axis of the endoscope, and thus the diameter of the endoscope can be reduced.

FIG. 25 shows a preferred construction where a diffraction element, such as the volume hologram, is placed in the prisms constituting the optical system of the present invention. In this figure, a decentering prism P is the first prism contained in the observing optical system or the imaging optical system of the present invention. Now, when a surface C of the diffraction element 6 is formed with a square as shown in the figure, it is desirable that a symmetrical plane D where the 1-1 surface of the decentering prism P is configured as a surface-symmetrical free curved surface is parallel to at least one of the sides constituting the square of the surface C of the diffraction element 6 in order to form a favorable image.

Moreover, when each of four interior angles of the surface C of the diffraction element 6, such as a square or rectangle, is nearly 90°, it is favorable that the symmetrical plane D of the surface-symmetrical free curved surface is parallel to two sides of the surface C of the diffraction element 6 which are parallel to each other and coincides with a position where the surface C of the diffraction element 6 is made symmetrical horizontally or vertically. By doing so, when optical parts are incorporated in the apparatus, a high degree of accuracy of assembly is obtained, which is effective for mass production.

When a plurality of surfaces or all surfaces, of the 1-1 surface, the 1-2 surface, and the 1-3 surface which are the optical surfaces constituting the decentering prism P, are configured as surface-symmetrical free curved surface, it is desirable for design and correction for aberration that the symmetrical planes of the plurality of surfaces or all surfaces are placed on the same plane D. It is also desirable that the relationship between the symmetrical plane D and the symmetrical plane of power of the diffraction element 6 is the same as in the above description.

What is claimed is:

1. An optical system, interposed between a pupil plane and an image plane, comprising:
   a first prism;
   a second prism; and
   a holographic element sandwiched between said first prism and said second prism, cemented to these prisms,
   wherein when a light beam traveling along an optical path connecting said pupil plane and said image plane through said optical system is called a first beam, said first prism has a 1-1 surface placed on a pupil side, combining a function of transmission with a function of reflection of said first beam; a 1-2 surface placed on an opposite side of a pupil with respect to said 1-1 surface; and a 1-3 surface placed on an image side, transmitting said first beam,
   said second prism includes a 2-1 surface having a shape identical with said 1-2 surface, placed opposite thereto to transmit said first beam at least twice, and a 2-2 surface placed on the opposite side of the pupil with respect to said 2-1 surface of said second prism, reflecting said first beam,
   said holographic element is constructed so that said first beam, when entering said holographic element at a first incident angle, is diffracted and reflected and when entering said holographic element at a second or third incident angle, is transmitted, and thereby said 1-2 surface of said first prism combines a function of transmission with a function of reflection of said first beam, and
   said 1-1 surface of said first prism is configured as a totally reflecting surface such that when said first beam is incident on said 1-1 surface at an incident angle over a totally reflecting critical angle, said first beam is reflected, while when said first beam is incident at an incident angle below said critical angle, said first beam is transmitted, and thereby said 1-1 surface combines a function of reflection with a function of transmission.

2. An observing optical system including an optical system interposed between a pupil plane and an image plane, said optical system comprising:
   a first prism;
   a second prism; and
   a holographic element sandwiched between said first prism and said second prism, cemented to these prisms,
   wherein when a light beam traveling along an optical path connecting said pupil plane and said image plane through said optical system is called a first beam, said first prism has a 1-1 surface placed on a pupil side, combining a function of transmission with a function of reflection of said first beam; a 1-2 surface placed on an opposite side of a pupil with respect to said 1-1 surface; and a 1-3 surface placed on an image side, transmitting said first beam,
   said second prism includes a 2-1 surface having a shape identical with said 1-2 surface, placed opposite thereto to transmit said first beam at least twice, and a 2-2 surface placed on the opposite side of the pupil with respect to said 2-1 surface of said second prism, reflecting said first beam,
   said holographic element is constructed so that said first beam, when entering said holographic element at a first incident angle, is diffracted and reflected and when entering said holographic element at a second or third incident angle, is transmitted, and thereby said 1-2 surface of said first prism combines a function of transmission with a function of reflection of said first beam, and
   said 1-1 surface of said first prism is configured as a totally reflecting surface such that when said first beam is incident on said 1-1 surface at an incident angle over a totally reflecting critical angle, said first beam is reflected, while when said first beam is incident at an incident angle below said critical angle, said first beam is transmitted, and thereby said 1-1 surface combines a function of reflection with a function of transmission,
   wherein an image display element for displaying an image observed by an observer is located at said image plane,
   an exit pupil is formed so that an observer's eye is situated at said pupil plane,
   said first beam emanating from said image display element is at least transmitted through said 1-3 surface to enter said first prism, and upon entering said 1-2 surface at said first incident angle, is diffracted and reflected by said holographic element,
   said first beam is then totally reflected by said 1-1 surface and is incident at said second incident angle on said 1-2 surface,
   said first beam is transmitted through said holographic element to emerge once from said first prism, and after being transmitted through said 2-1 surface to enter said second prism, is reflected by said 2-2 surface and enters said 2-1 surface at said third incident angle,
   said first beam is transmitted through said holographic element to emerge from said second prism and passes through said 1-2 surface, and
   said first beam entering again said first prism and passing through said 1-1 surface, finally leaves said first prism and is introduced toward said exit pupil.

3. An observing optical system according to claim 2, wherein an optical member is interposed between said 1-3 surface of said first prism and said image display element.

4. An observing optical system according to claim 2, wherein an optical member is interposed between said 1-1 surface of said first prism and said exit pupil.

5. An observing optical system according to claim 2, wherein said first prism has a reflecting surface for reflecting said first beam to introduce said first beam into said 1-2 surface in an optical path from said 1-3 surface to said 1-2 surface.

6. An observing optical system according to claim 2, wherein said first prism has a reflecting surface for reflecting said first beam to introduce said first beam into said 2-2 surface in an optical path from said 2-1 surface to said 2-2 surface.

7. An observing optical system according to claim 2, wherein each of said 1-2 surface of said first prism and said 2-1 surface of said second prism is configured as a planar surface, and said holographic element is cemented to said planar surface.

8. An observing optical system according to claim 2, wherein each of said 1-2 surface of said first prism and said 2-1 surface of said second prism is configured as a curved surface, and said holographic element is cemented to said curved surface.

9. An observing optical system according to claim 7 or 8, wherein said holographic element cemented between said first prism and said second prism is a volume hologram.

10. An observing optical system according to claim 2, wherein said 1-1 surface of said first prism is configured as a free curved surface.

11. An observing optical system according to claim 2, wherein said 1-1 surface of said first prism is configured as a rotational symmetrical aspherical surface.

12. An observing optical system according to claim 2, wherein when a ray connecting a center of said pupil plane and a center of said image plane is taken as an axial principal ray, an extension of said axial principal ray from a position where the ray passes through said exit pupil is taken as a visual axis, and an angle made by said visual axis with a line perpendicular to an image surface of said image display element placed at said image plane is represented by θ, said image display element is placed to satisfy the following condition:

$$40.0° < |θ| < 100.0°$$

13. An observing optical system according to claim 12, wherein said image display element is placed to satisfy the following condition:

$$60.0° < |θ| < 85.0°$$

14. An observing optical system according to claim 13, wherein said image display element is placed to satisfy the following condition:

$$65.0° < |θ| < 73.0°$$

15. An observing optical system according to claim 2, wherein said 2-2 surface of said second prism is configured as a totally reflecting surface that reflects a beam of light when said beam is incident at incident angle exceeding a totally reflecting critical angle on said 2-2 surface, and transmits said beam when said beam is incident at an incident angle below said totally reflecting critical angle on said 2-2 surface.

16. An observing optical system according to claim 15, wherein an optical member for transmitting light is provided on a side of said 2-2 surface of said second prism.

17. An imaging optical system including an optical system interposed between a pupil plane and an image plane, said optical system comprising:

a first prism;

a second prism; and a holographic element sandwiched between said first prism and said second prism, cemented to these prisms, wherein when a light beam traveling along an optical path connecting said pupil plane and said image plane through said optical system is called a first beam, said first prism has a 1-1 surface placed on a pupil side, combining a function of transmission with a function of reflection of said first beam; a 1-2 surface placed on an opposite side of a pupil with respect to said 1-1 surface; and a 1-3 surface placed on an image side, transmitting said first beam, said second prism includes a 2-1 surface having a shape identical with said 1-2 surface, placed opposite thereto to transmit said first beam at least twice, and a 2-2 surface placed on the opposite side of the pupil with respect to said 2-1 surface of said second prism, reflecting said first beam, said holographic element is constructed so that said first beam, when entering said holographic element at a first incident angle, is diffracted and reflected and when entering said holographic element at a second or third incident angle, is transmitted, and thereby said 1-2 surface of said first prism combines a function of transmission with a function of reflection of said first beam, and said 1-1 surface of said first prism is configured as a totally reflecting surface such that when said first beam is incident on said 1-1 surface at an incident angle over a totally reflecting critical angle, said first beam is reflected, while when said first beam is incident at an incident angle below said critical angle, said first beam is transmitted, and thereby said 1-1 surface combines a function of reflection with a function of transmission, wherein an image sensor for picking up an image of an object is placed at said image plane, an aperture stop for adjusting brightness of a beam of light from an object is placed at said pupil plane, said light passing through said aperture stop, at least, is transmitted through said 1-1 surface to enter said first prism and is incident at said third incident angle on said 1-2 surface, said light, after being transmitted through said holographic element and emerging once from said first prism, is transmitted through said 2-1 surface to enter said second prism, and is reflected by said 2-2 surface so that said light is incident at said second incident angle on said 2-1 surface, said light is then transmitted through said holographic element and emerges from said second prism, said light passes through said 1-2 surface to enter again said first prism, and after being totally reflected by said 1-1 surface, is incident at said first incident angle on said 1-2 surface, and said light is diffracted and reflected by said holographic element and is transmitted through said 1-3 surface so that said light leaves said first prism and is introduced into said image sensor.

18. An imaging optical system according to claim 17, wherein an optical member is interposed between said 1-3 surface of said first prism and said image sensor.

19. An imaging optical system according to claim 17, wherein an optical member is interposed between said 1-1 surface of said first prism and said aperture stop.

20. An imaging optical system according to claim 17, wherein said first prism has a reflecting surface for reflecting said first beam to introduce said first beam into said 1-3 surface in an optical path from said 1-2 surface to said 1-3 surface.

21. An imaging optical system according to claim 17, wherein said second prism has a reflecting surface for reflecting said first beam to introduce said first beam into said 2-2 surface in an optical path from said 2-2 surface to said 2-1 surface.

22. An imaging optical system according to claim 17, wherein each of said 1-2 surface of said first prism and said 2-1 surface of said second prism is configured as a planar surface, and said holographic element is cemented to said planar surface.

23. An imaging optical system according to claim 17, wherein each of said 1-2 surface of said first prism and said 2-1 surface of said second prism is configured as a curved surface, and said holographic element is cemented to said curved surface.

24. An imaging optical system according to claim 22 or 23, wherein said holographic element cemented between said first prism and said second prism is a volume hologram.

25. An imaging optical system according to claim 17, wherein said 1-1 surface of said first prism is configured as a free curved surface.

26. An imaging optical system according to claim 17, wherein said 1-1 surface of said first prism is configured as an aspherical surface.

27. An imaging optical system according to claim 17, wherein when a ray connecting a center of said aperture stop and a center of said image plane is taken as an axial principal ray, an extension of said axial principal ray from a position where the ray passes through said aperture stop is taken as a visual axis, and an angle made by said visual axis with a line perpendicular to an image surface of said image sensor placed at said image plane is represented by θ, said image sensor is placed to satisfy the following condition:

$$40.0°<|\theta|<100.0°$$

28. An imaging optical system according to claim 27, wherein said image sensor is placed to satisfy the following condition:

$$60.0°<|\theta|<85.0°$$

29. An imaging optical system according to claim 28, wherein said image sensor is placed to satisfy the following condition:

$$65.0°<|\theta|<73.0°$$

30. An imaging optical system according to claim 17, wherein when a medium of said second prism is constructed of a liquid and a reflecting surface of said second prism is configured as a deformable mirror, said second prism is used as a focusing mechanism.

31. A head mounted image display having an observing optical system including an optical system interposed between a pupil plane and an image plane, said optical system comprising:

a first prism;

a second prism; and a holographic element sandwiched between said first prism and said second prism, cemented to these prisms, wherein when a light beam traveling along an optical path connecting said pupil plane and said image plane through said optical system is called a first beam, said first prism has a 1-1 surface placed on a pupil side, combining a function of transmission with a function of reflection of said first beam; a 1-2 surface placed on an opposite side of a pupil with respect to said 1-1 surface; and a 1-3 surface placed on an image side, transmitting said first beam, said second prism includes a 2-1 surface having a shape identical with said 1-2 surface, placed opposite thereto to transmit said first beam at least twice, and a 2-2 surface placed on the opposite side of the pupil with respect to said 2-1 surface of said second prism, reflecting said first beam, said holographic element is constructed so that said first beam, when entering said holographic element at a first incident angle, is diffracted and reflected and when entering said holographic element at a second or third incident angle, is transmitted, and thereby said 1-2 surface of said first prism combines a function of transmission with a function of reflection of said first beam, and said 1-1 surface of said first prism is configured as a totally reflecting surface such that when said first beam is incident on said 1-1 surface at an incident angle over a totally reflecting critical angle, said first beam is reflected, while when said first beam is incident at an incident angle below said critical angle, said first beam is transmitted, and thereby said 1-1 surface combines a function of reflection with a function of transmission, wherein an image display element for displaying an image observed by an observer is located at said image plane, an exit pupil is formed so that an observer's eye is situated at said pupil plane, said first beam emanating from said image display element is at least transmitted through said 1-3 surface to enter said first prism, and upon entering said 1-2 surface at said first incident angle, is diffracted and reflected by said holographic element, said first beam is then totally reflected by said 1-1 surface and is incident at said second incident angle on said 1-2 surface, said first beam is transmitted through said holographic element to emerge once from said first prism, and after being transmitted through said 2-1 surface to enter said second prism, is reflected by said 2-2 surface and enters said 2-1 surface at said third incident angle, said first beam is transmitted through said holographic element to emerge from said second prism and passes through said 1-2 surface, and said first beam entering again said first prism and passing through said 1-1 surface, finally leaves said first prism and is introduced toward said exit pupil, wherein said head mounted image display comprises:

a body incorporating said observing optical system;

a supporting member for supporting said body on an observer's head so that an exit pupil of said observing optical system is located at a position of an observer's eye, and a speaker member for providing a sound to an observer's ear.

32. A head mounted image display according to claim 31, wherein said body is provided with an observing optical system for right eye and an observing optical system for left eye, and said speaker member has a speaker member for right ear and a speaker member for left ear.

33. A head mounted image display according to claim 31 or 32, wherein said speaker member is an earphone.

* * * * *